United States Patent
Weiss et al.

(10) Patent No.: US 12,020,415 B2
(45) Date of Patent: *Jun. 25, 2024

(54) METHOD FOR MONITORING MANUFACTURE OF ASSEMBLY UNITS

(71) Applicant: Instrumental, Inc., Palo Alto, CA (US)

(72) Inventors: Samuel Bruce Weiss, Sunnyvale, CA (US); Anna-Katrina Shedletsky, Sunnyvale, CA (US); Simon Kozlov, Sunnyvale, CA (US); Tilmann Bruckhaus, Sunnyvale, CA (US); Shilpi Kumar, Sunnyvale, CA (US); Isaac Sukin, Sunnyvale, CA (US); Ian Theilacker, Sunnyvale, CA (US); Brendan Green, Sunnyvale, CA (US)

(73) Assignee: Instrumental, Inc., Los Altos, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/855,130

(22) Filed: Jun. 30, 2022

(65) Prior Publication Data

US 2022/0335589 A1 Oct. 20, 2022

Related U.S. Application Data

(63) Continuation of application No. 17/461,773, filed on Aug. 30, 2021, now Pat. No. 11,763,443, which is a
(Continued)

(51) Int. Cl.
*G06T 7/00* (2017.01)
*G06F 18/213* (2023.01)
(Continued)

(52) U.S. Cl.
CPC .......... *G06T 7/0004* (2013.01); *G06F 18/213* (2023.01); *G06F 18/40* (2023.01);
(Continued)

(58) Field of Classification Search
CPC .................. G06T 7/0004; G06T 7/001; G06T 2207/30116; G06T 2207/30164;
(Continued)

(56) References Cited

U.S. PATENT DOCUMENTS 6,314,201 B1 * 11/2001 Roder .................... G01R 31/71
382/106
6,563,324 B1 * 5/2003 Nichani .................. G06T 7/001
324/537

(Continued)

*Primary Examiner* — Solomon G Bezuayehu
(74) *Attorney, Agent, or Firm* — Run8 Patent Group, LLC; Peter Miller; Alexander Rodriguez

(57) ABSTRACT

One variation of a method for monitoring manufacture of assembly units includes: receiving selection of a target location hypothesized by a user to contain an origin of a defect in assembly units of an assembly type; accessing a feature map linking non-visual manufacturing features to physical locations within the assembly type; for each assembly unit, accessing an inspection image of the assembly unit recorded by an optical inspection station during production of the assembly unit, projecting the target location onto the inspection image, detecting visual features proximal the target location within the inspection image, and aggregating non-visual manufacturing features associated with locations proximal the target location and representing manufacturing inputs into the assembly unit based on the feature map; and calculating correlations between visual and non-visual manufacturing features associated with locations proximal the target location and the defect for the set of assembly units.

19 Claims, 5 Drawing Sheets

Related U.S. Application Data continuation of application No. 16/506,905, filed on Jul. 9, 2019, now Pat. No. 11,132,787.

(60) Provisional application No. 62/695,727, filed on Jul. 9, 2018.

(51) Int. Cl.
  *G06F 18/40* (2023.01)
  *G06V 10/25* (2022.01)
  *G06V 10/40* (2022.01)
  *G06V 10/771* (2022.01)

(52) U.S. Cl.
  CPC .............. *G06T 7/001* (2013.01); *G06V 10/25* (2022.01); *G06V 10/40* (2022.01); *G06V 10/771* (2022.01); *G06T 2207/30116* (2013.01); *G06T 2207/30164* (2013.01)

(58) Field of Classification Search
  CPC ......... G06T 2207/30141; G06F 18/213; G06F 18/40; G06F 18/211; G06V 10/25; G06V 10/40; G06V 10/771
  See application file for complete search history.

(56) References Cited

U.S. PATENT DOCUMENTS

| | | | | |
|---|---|---|---|---|
| 6,621,566 B1* | | 9/2003 | Aldrich | G01R 31/309 356/237.4 |
| 7,075,565 B1* | | 7/2006 | Raymond | G01N 21/95684 348/126 |
| 8,149,989 B2* | | 4/2012 | Schnell | B65G 43/02 378/58 |
| 2002/0057830 A1* | | 5/2002 | Akin | H05K 13/0815 382/147 |
| 2002/0159643 A1* | | 10/2002 | DeYong | G06F 18/00 382/170 |
| 2003/0113009 A1* | | 6/2003 | Mueller | G06T 7/521 382/147 |
| 2004/0010444 A1* | | 1/2004 | Delorme | G01R 31/281 702/183 |
| 2004/0218223 A1* | | 11/2004 | Bernardi | H04N 1/4015 358/3.26 |
| 2007/0047797 A1* | | 3/2007 | Vilella | G06T 7/0004 382/141 |
| 2008/0281548 A1* | | 11/2008 | Algranati | G06T 7/001 702/123 |
| 2010/0007896 A1* | | 1/2010 | Fishbaine | G01N 21/8806 356/603 |
| 2010/0260378 A1* | | 10/2010 | Noy | G06T 7/12 382/103 |
| 2011/0026804 A1* | | 2/2011 | Jahanbin | G06T 7/45 382/141 |
| 2012/0302122 A1* | | 11/2012 | Sbar | B23K 26/0622 445/2 |
| 2013/0219696 A1* | | 8/2013 | Kurita | G06T 7/001 348/135 |
| 2014/0168643 A1* | | 6/2014 | Lin | G01N 21/958 356/239.3 |
| 2014/0198185 A1* | | 7/2014 | Haugen | G06T 7/521 348/47 |
| 2014/0210982 A1* | | 7/2014 | Zuo | G06T 7/001 382/145 |
| 2014/0212022 A1* | | 7/2014 | Geshel | G01R 31/26 382/149 |
| 2014/0320633 A1* | | 10/2014 | Haugen | H04N 23/74 348/87 |
| 2015/0051860 A1* | | 2/2015 | Zuo | G01N 21/956 702/82 |
| 2016/0270274 A1* | | 9/2016 | Toyoda | H05K 13/08 |
| 2017/0236266 A1* | | 8/2017 | Rostami | H04N 23/56 348/131 |
| 2019/0164265 A1* | | 5/2019 | Liao | G06T 7/001 |
| 2019/0285554 A1* | | 9/2019 | Konishi | G06T 1/00 |
| 2020/0281519 A1* | | 9/2020 | Gowans | A61F 13/0206 |

* cited by examiner

S100,
S160

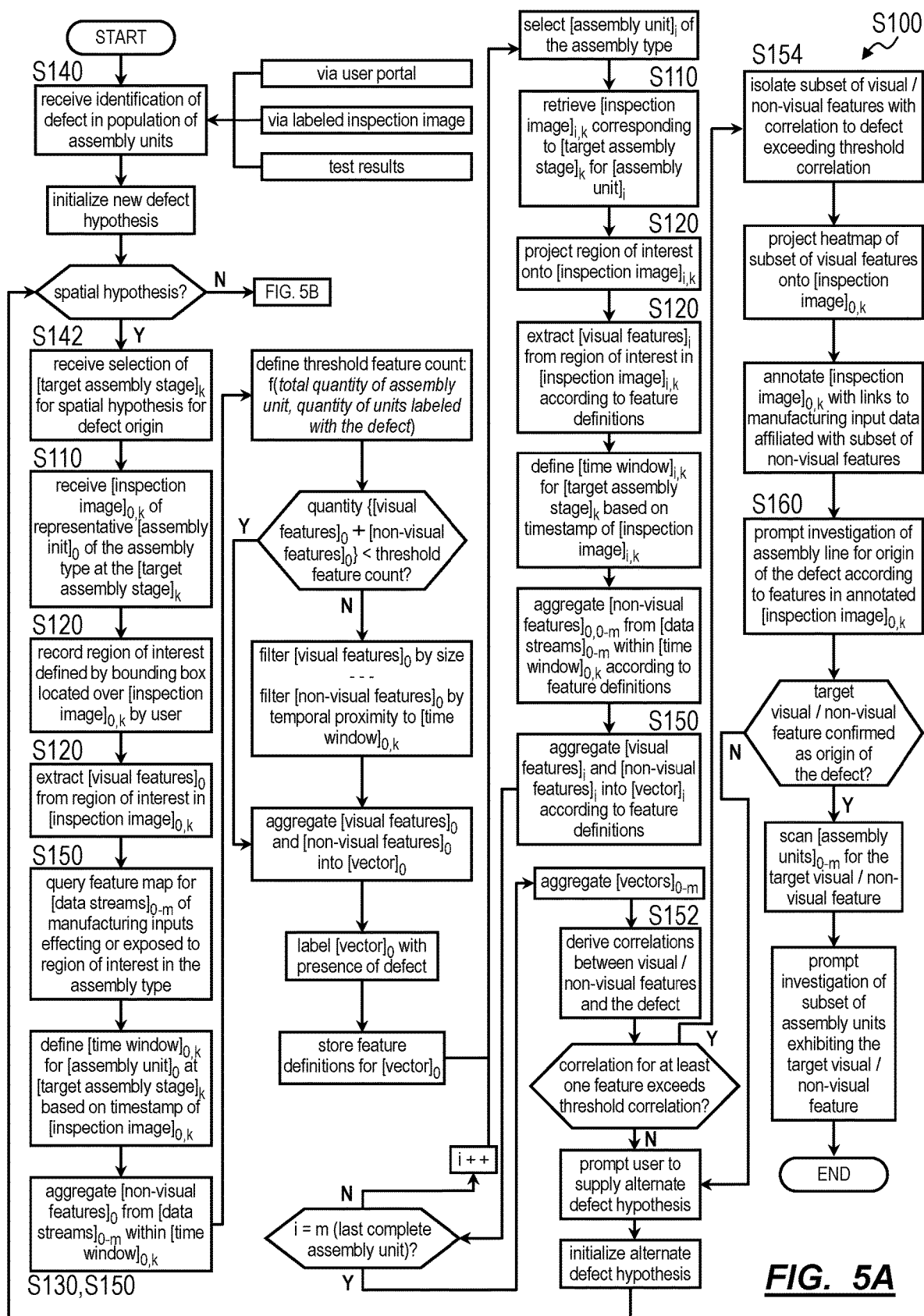

METHOD FOR MONITORING MANUFACTURE OF ASSEMBLY UNITS

CROSS-REFERENCE TO RELATED APPLICATIONS

This Application is a continuation of U.S. patent application Ser. No. 17/461,773, filed on 30 Aug. 2021, which is a continuation of U.S. patent application Ser. No. 16/506,905, filed on 9 Jul. 2019, which claims the benefit of U.S. Provisional Application No. 62/695,727, filed on 9 Jul. 2018, each of which is incorporated in its entirety by this reference.

This Application is related to U.S. patent application Ser. Nos. 15/407,158, 15/407,162, 15/653,040, and 15/953,206, each of which is incorporated in its entirety by this reference.

TECHNICAL FIELD

This invention relates generally to the field of optical inspection and more specifically to a new and useful method for monitoring manufacture of assembly units in the field of manufacturing.

BRIEF DESCRIPTION OF THE FIGS.

FIGS. 5A and 5B are flowchart representation of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

As shown in FIGS. 1-4, a method S100 for monitoring manufacture of assembly units includes: accessing a set of inspection images of a set of assembly units, of a particular assembly type, recorded by optical inspection stations during production of the set of assembly units in Block S110; for each inspection image in the set of inspection images, detecting a set of visual features in the inspection image in Block S120; aggregating a set of non-visual manufacturing features representing a set of manufacturing inputs to the particular assembly type during production on an assembly line in Block S130; receiving indication of a defect identified in a subset of assembly units in the set of assembly units in Block S140; receiving selection of a particular location, for the particular assembly type, hypothesized by a user to contain an origin of the defect in Block S142; calculating weights of visual features in the set of visual features proportional to spatial proximity to the particular location in Block S150; based on a feature map linking the set of manufacturing inputs to regions of the particular assembly unit type, calculating weights of manufacturing inputs in the set of manufacturing inputs based on temporal proximity and spatial proximity to a set of manufacturing steps effecting the particular location for the particular assembly type in Block S150; calculating correlations between a subset of visual features in the set of visual features, a subset of non-visual manufacturing features in the set of non-visual manufacturing features, and presence of the defect across the set of assembly units based on weights of visual features in the set of visual features and weights of manufacturing inputs in the set of manufacturing inputs in Block S152; isolating a particular manufacturing input, in the set of manufacturing inputs, linked to visual features and non-visual manufacturing features exhibiting greatest correlation to the defect in Block S154; and outputting a prompt to inspect the particular manufacturing input in Block S16o.

Figure 5B:
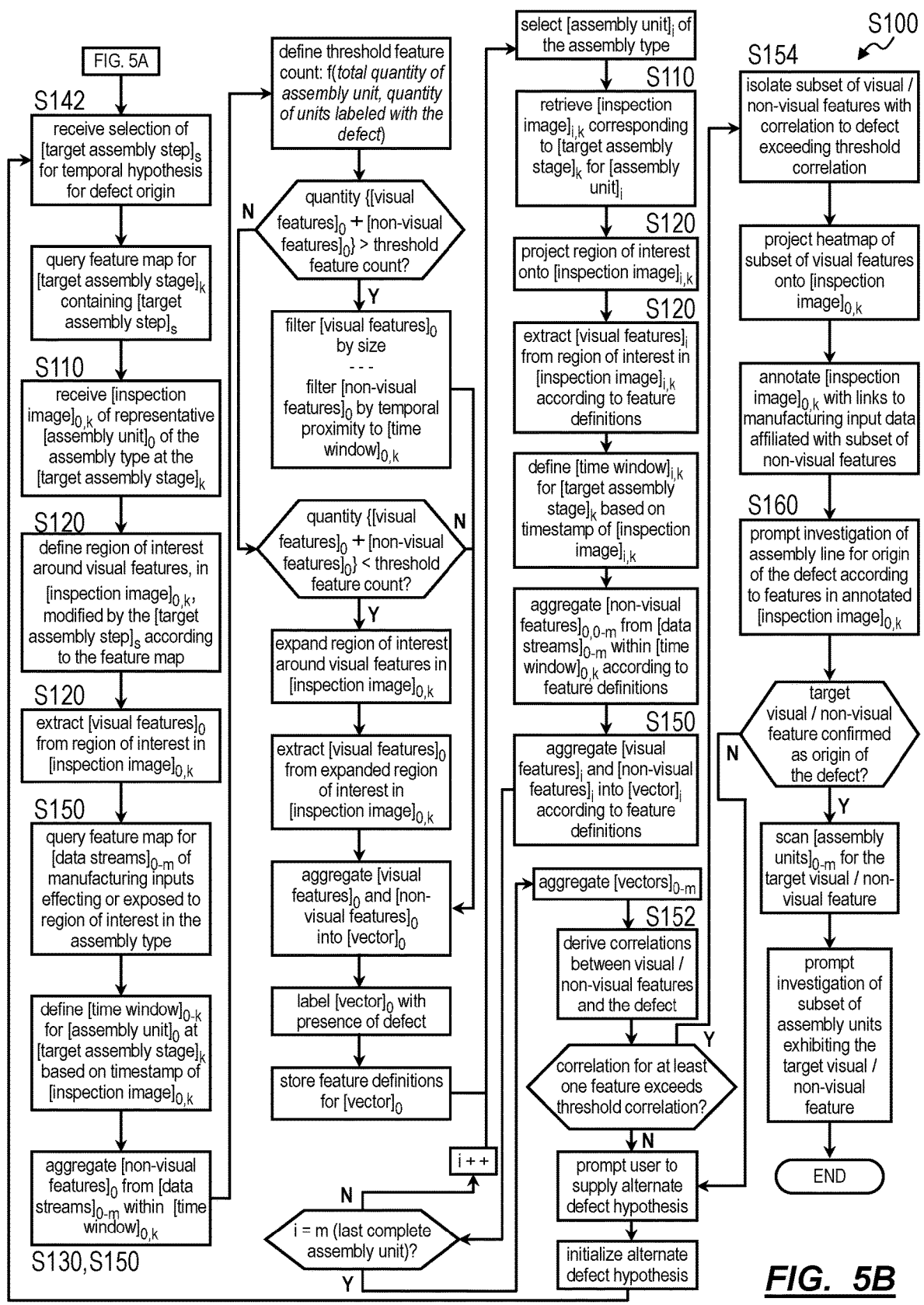

One variation of the method S100 shown in FIGS. 5A and 5B includes: receiving indication of a defect identified in a subset of assembly units in a set of assembly units of a particular assembly type in Block S140; identifying a target location, for the particular assembly type, hypothesized to contain an origin of the defect in Block S142; accessing a set of non-visual manufacturing features representing a set of manufacturing inputs into the set of assembly units during production of the set of assembly units in Block S130; and accessing a feature map linking the set of non-visual manufacturing features to locations within assembly units of the particular assembly type in Block S150. This variation of the method S100 also includes, for each assembly unit in the set of assembly units: accessing an inspection image, in a set of inspection images, depicting the assembly unit and recorded by an optical inspection station during production of the assembly unit in Block S110; projecting the target location onto the inspection image in Block S120; detecting a set of visual features proximal the target location in the inspection image in Block S120; and, based on the feature map, aggregating a subset of non-visual manufacturing features, in the set of non-visual manufacturing features, associated with locations proximal the target location in Block S150. This variation of the method S100 further includes: calculating correlations between sets of visual features proximal the target location, subsets of non-visual manufacturing features associated with locations proximal the target location, and the defect for the set of assembly units in Block S152; isolating a particular non-visual manufacturing feature, in the set of non-visual manufacturing features, exhibiting greatest correlation to the defect in Block S154; and generating a prompt to inspect a source of the particular non-visual manufacturing feature for the particular assembly type in Block S160.

As shown in FIGS. 5A and 5B, the foregoing variation of the method S100 can additionally or alternatively include, for each assembly unit in the set of assembly units: accessing an inspection image, in a set of inspection images, depicting the assembly unit and recorded by an optical inspection station during production of the assembly unit in Block S110; projecting the target location onto the inspection image in Block S120; detecting a set of visual features proximal the target location in the inspection image in Block S120; extracting a cluster of non-visual manufacturing features, in the set of non-visual manufacturing features, associated with times proximal a timestamp of the inspection image in Block S150; and, based on the feature map, aggregating a subset of non-visual manufacturing features, associated with locations proximal the target location for the assembly unit and associated with times proximal a timestamp of the inspection image, from the set of non-visual manufacturing features in Block S150.

2. Applications

Generally, the computer system can: leverage optical data of assembly units recorded during assembly to link structured and unstructured manufacturing data and assembly unit outcome data to these assembly units in both time and space; derive multi-dimensional correlations between visual features, non-visual features, and outcomes in assembly units based on temporal and physical proximity; and then output insights, guidance, or prompts to reduce defects and improve outcomes in future assembly units. In particular, the computer system can implement Blocks of the method S100 to anchor manufacturing data and assembly unit outcome data (e.g., defect vectors) to discrete locations in inspection images of assembly units recorded at discrete times during assembly of these assembly units. The computer system can then derive correlations between manufacturing inputs (i.e., non-visual features, such as tool settings, station operators, component batch numbers), physical features instantiated in assembly units in one or more stages of assembly and detectable (i.e., as visual features) in inspection images of these assembly units, and outcomes (e.g., defects, test results, inspection results) of these assembly units based on temporal and spatial proximity of these visual and non-visual features to detected or hypothesized origins of these defects in this population of assembly units.

The computer system can execute Blocks of the method S100 to develop a "feature map" (e.g., in the form of a multi-dimensional matrix for a particular assembly line) that links manufacturing inputs (e.g., control inputs, measurements, test results) to physical regions of assembly units at various assembly stages—depicted in inspection images recorded along the assembly line—including in both space and time. In particular, the feature map can store: physical locations at which manufacturing inputs effect or modify a particular point, line, area, or volume location on assembly units of this assembly type; relative times that these manufacturing inputs are applied to these assembly units of this assembly type during a sequence of manufacturing steps and assembly stages; and/or relative times that these assembly units are exposed to these manufacturing input during this sequence of manufacturing steps and assembly stages s. For example, during or after production of a first assembly unit at an assembly line, the computer system can ingest time-series and/or georeferenced) manufacturing data of different types for this assembly unit, such as: timestamped ambient data; assembly technician and station operator identifiers; component supplier and batch identifiers; component test data; screw driver torques; adhesive types and application conditions; finishing processes; assembly order; line equipment settings and timestamped use data; etc. These manufacturing data can include: binary values (e.g., "yes" or "no" values representing whether an antenna was installed on the assembly unit, "pass" or "fail" values for a test result of an antenna installed on the assembly unit); higher-resolution numerical measurements (e.g., antenna length in millimeters); and/or vectors or spectral values (e.g., a timeseries or spectral response, such as signal strength in decibels over a frequency range). The computer system can also ingest timestamped inspection images (e.g., 2D color photographic images; IR, UV, X-ray, or multi-spectral images; 3D CT or stereoscopic images) of this assembly unit recorded by optical inspection stations along the assembly line.

When the assembly unit is tested—such as during or after assembly—and a defect in the assembly unit subsequently identified, the user may enter a type, scope, magnitude, or other description of this defect for the assembly unit via a user portal. The computer system can ingest this defect description and prompt the user to enter a hypothesis for an origin of this defect, such as: a physical location of a particular component on the assembly unit that the user predicts caused the defect (e.g., due to failure of the particular component); a physical location proximal a cluster of components the user predicts yielded the defect (e.g., due to misalignment of these components); or a relative time or assembly step during manufacture of the assembly unit in which the user predicts occurrence of an error or exposure that yielded the defect. The computer system can also prompt the user to enter multiple hypotheses for spatial or temporal origins of the defect and then link these spatial or temporal hypotheses to the defect.

For example, for a spatial hypothesis for the defect, the computer system can: link the defect to a region of interest around a hypothesized spatial origin of the defect; and extract visual features from this region of interest depicted in an inspection image of the assembly unit recorded by an optical inspection station along the assembly line. The computer system can also: collate manufacturing inputs (e.g., assembly steps) associated with changes on the assembly unit near this region of interest based on the feature map for this assembly type; retrieve timestamped non-visual manufacturing data descriptive of these manufacturing inputs when applied to the assembly unit to effect the region of interest (e.g., tool settings, components batch numbers, and station operators recorded at times proximal a timestamp of the inspection image immediately preceding a process in the region of interest); and retrieve timestamped non-visual manufacturing data descriptive of other conditions exposed to, applied to, or otherwise affecting the assembly unit—according to the feature map—at times approximately concurrent these changes near the region of interest in the assembly unit.

In another example, for a temporal hypothesis for the defect, the computer system can: identify a set of manufacturing inputs (e.g., assembly steps) applied to the assembly unit near the hypothesized time of the defect origin based on the feature map; aggregate points, lines, areas, or volumes on the assembly unit associated with this set of manufacturing inputs based on the feature map; project these points, lines, areas, or volumes onto an inspection image of the assembly unit recorded near (and immediately after) the hypothesized time of the defect origin to define a set of regions of interest; and extract visual features from these regions of interest depicted in the inspection image. The computer system can also: retrieve timestamped non-visual manufacturing data descriptive of these manufacturing inputs when applied to the assembly unit to effect the region of interest (e.g., tool settings, components batch numbers, and station operators recorded at times proximal a timestamp of the inspection image immediately preceding a process in the region of interest); and retrieve timestamped non-visual manufacturing data descriptive of other conditions exposed to, applied to, or otherwise affecting the assembly unit—according to the feature map—at times approximately concurrent these changes near the region of interest in the assembly unit.

In the foregoing examples, the computer system can then compile these visual features and non-visual features into a container (e.g., a vector) and repeat this process to generate similar containers for other assembly units of the same assembly type by projecting this region of interest onto inspection images of these other assembly units and aggregating visual and non-visual features for these other assembly units according to the region of interest and the feature map. The computer system can then implement artificial intelligence, machine learning (e.g., with embeddings), regression, statistical analysis, and/or other methods and techniques to quantify correlations between these features and the defect.

The computer system can thus execute Blocks of the method S100 to: develop a contextual understanding of relationships between manufacturing inputs and physical features in assembly units of a particular assembly type; implement this contextual understanding to filter a large set of visual assembly unit features and non-visual process-related features down to a small number of features spatially and temporally nearest—and therefore most likely to effect—a defect in an assembly unit of this type; and to converge on an even smaller number of target visual and/or non-visual features exhibiting greatest correlation (or covariance, or probability of causation) to this defect.

The computer system can then present these target features to a user (e.g., a manufacturing engineer, a line technician or operator), such as by: overlaying colored markers with defect correlation values (e.g., from 0.00 to 1.00) over corresponding visual target features in an inspection image of an assembly unit of this type; populating an investigation spreadsheet with descriptors of non-visual target features (e.g., a tool identifier and description, an operator ID, an assembly stage identifier) and their corresponding defect correlation values; and then serving this annotated inspection image and investigation spreadsheet to the user, such as through a user portal within a native application or accessed via a web browser executing on the user's computing device. The user may then sequentially investigate—remotely or in-person at the assembly line—these target features, such as in order of their defect correlation values.

Therefore, rather than scan all available (e.g., thousands of, millions of) visual and non-visual features representative of an assembly unit for strength of correlation to a defect, the computer system can instead execute Blocks of the method S100 to focus derivation of strength of correlation to a defect for a small subset of visual and non-visual features of an assembly unit that are spatially and temporally proximal a defect origin hypothesized by the user. Thus, the computer system can execute Blocks of the method S100 to rapidly and accurately isolate a small number of visual and/or non-visual features that exhibit strongest correlation to a defect—despite quantity of imaged assembly units (e.g., as few as ten or as many millions of imaged assembly units) and with minimal computational load. The computer system can further execute Blocks of the method S100 to articulate these correlations to a user in order to guide manufacturing-related investigations into origins of the defect, thereby enabling the user to rapidly isolate an origin of a defect—despite the quantity of imaged assembly units—and to correct this origin to reduce frequency of this defect.

3. System

Blocks of the method S100 can be executed by a computer system, such as: locally on an optical inspection station (as described below) at which inspection images of assembly units are recorded; locally near an assembly line populated with optical inspection stations; within a manufacturing space or manufacturing center occupied by this assembly line; or remotely at a remote server connected to optical inspection stations via a computer network (e.g., the Internet), etc. The computer system can also interface directly with other sensors arranged along or near the assembly line to collect non-visual manufacturing and test data or retrieve these data from a report database associated with the assembly. Furthermore, the computer system can interface with databases containing other non-visual manufacturing data for assembly units produced on this assembly line, such as: test data for batches of components supplied to the assembly line; supplier, manufacturer, and production data for components supplied to the assembly line; etc.

The computer system can also interface with a user (e.g., an engineer, an assembly line worker) via a user portal—such as accessible through a web browser or native application executing on a laptop computer or smartphone—to serve prompts and notifications to the user and to receive defect labels, anomaly feedback, or other supervision from the user.

The method S100 is described below as executed by the computer system: to map a relationship between visual and non-visual features for an assembly type in time and space; to leverage these relationships to derive correlations between defects detected in assembly units of this type and visual/non-visual data collected during production of these assembly units; and to leverage these relationships to correlate visual anomalies in assembly units to non-visual root causes (and vice versa) based on visual and non-visual data collected during production of these assembly units. However, the method S100 can be similarly implemented by the computer system to derive correlations between visual/non-visual features and anomalies/defects in singular parts (e.g., molded, cast, stamped, or machined parts) based on inspection image and non-visual manufacturing data generated during production of these singular parts.

4. Optical Inspection Station and Inspection Images

Figure 1:
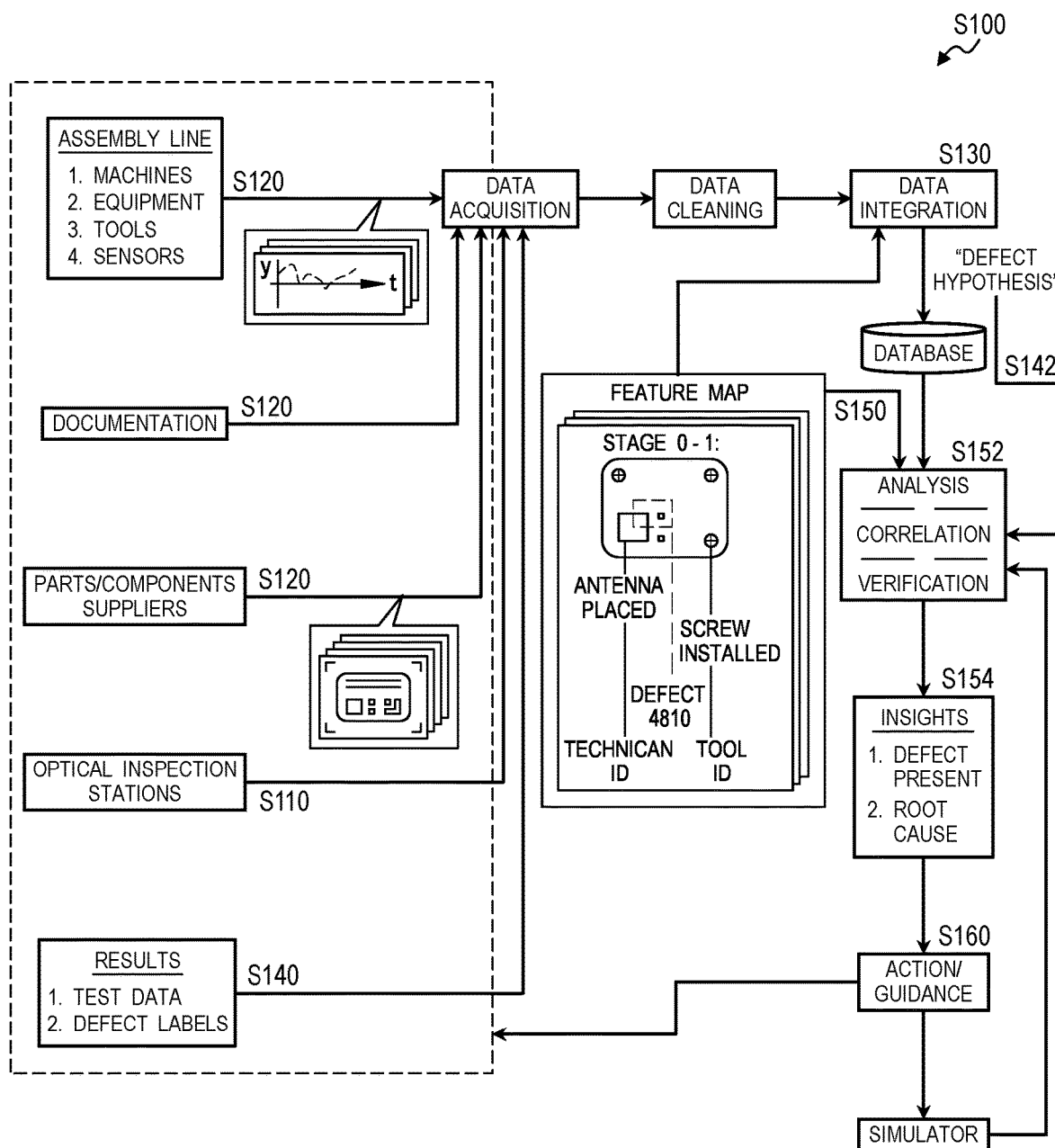
FIG. 1 is a flowchart representation of a method.

As shown in FIG. 1, the computer system accesses inspection images recorded by an optical inspection station during assembly of assembly units in Block S110. For example, the computer system can retrieve inspection images recorded by an optical inspection station, uploaded from the optical inspection station to a file system (e.g., a database) via a computer network, and stored in a database. The computer system can additionally or alternatively retrieve inspection images directly from the optical inspection station, such as in real-time when an inspection image of an assembly unit is recorded by the optical inspection station.

As described in U.S. patent application Ser. No. 15/653,040, an optical inspection station can include: an imaging platform that receives a part or assembly; a visible light camera (e.g., a RGB CMOS, or black and white CCD camera) that captures inspection images (e.g., digital photographic color images) of units placed on the imaging platform; and a data bus that offloads inspection images, such as to a local or remote database. An optical inspection station can additionally or alternatively include multiple visible light cameras, one or more infrared cameras, a laser depth sensor, etc.

In one implementation, an optical inspection station also includes a depth camera, such as an infrared depth camera, configured to output depth images. In this implementation, the optical inspection station can trigger both the visible light camera and the depth camera to capture a color image and a depth image, respectively, of each unit placed on the imaging platform. Alternatively, the optical inspection station can include optical fiducials arranged on and/or near the imaging platform. In this implementation, the optical inspection station (or a local or remote computer system interfacing with the remote database) can implement machine vision techniques to identify these fiducials in a color image captured by the visible light camera and to transform sizes, geometries (e.g., distortions from known geometries), and/or positions of these fiducials within the color image into a depth map, into a three-dimensional color image, or into a three-dimensional measurement space (described below) for the color image, such as by passing the color image into a neural network.

Upon receipt or retrieval of an inspection image, the computer system can "dewarp," "flatten," or otherwise pre-process the inspection image in Block S110 in preparation for detecting and extracting features from the inspection image in Block S120, as described in U.S. patent application Ser. No. 15/407,158. The computer system can also: implement computer vision techniques (e.g., object recognition, edge detection) to identify a perimeter or boundary of the assembly unit in the inspection image; and then crop the inspection image around the assembly unit such that only features corresponding to the assembly unit are extracted from the inspection image and processed in Block S120 of the method S100.

The computer system can thus aggregate a set of (e.g., 100, 1,000, or 100,000) inspection images (e.g., digital color photographic image) recorded over a period of operation of an assembly line in Block S110, wherein each inspection image records visual characteristics of a unique assembly unit at a particular production stage. However, the computer system can access inspection images of any other type and in any other way in Block S110.

5. Visual Feature Extraction

Block S120 of the method S100 recites, for each inspection image in the set of inspection images, detecting a set of features in the inspection image. Generally, in Block S120, the computer system identifies multiple (e.g., "n," or "many") features representative of an assembly unit depicted in an inspection image, characterizes these features, and aggregates these features into a multi-dimensional (e.g., "n-dimensional") vector or other container uniquely representing this assembly unit.

In one implementation, the computer system implements a feature classifier that defines: types of single-order features (e.g., corners, edges, areas, gradients); types of second-order features constructed from multiple single-order features (e.g., edge orientation and gradient magnitude of an edge, polarity and strength of a blob); metrics for relative positions and orientations of multiple features; and/or prioritization for detecting and extracting features from an inspection image. The computer system can then apply this feature classifier to the full height and width of a region of the inspection image representing the assembly unit. For example, the computer system can implement low-level computer vision techniques (e.g., edge detection, ridge detection), curvature-based computer vision techniques (e.g., changing intensity, autocorrelation), and/or shape-based computer vision techniques (e.g., thresholding, blob extraction, template matching)—according to the feature classifier—to detect n-number of highest-priority features representing the assembly unit in the inspection image in Block S120.

The computer system can then extract a local image patch around these features in Block S120, such as in the form of a multi-dimensional (e.g., n-dimensional) feature vector (hereinafter a "vector") representing a corpus (e.g., thousands, millions) of features extracted from the inspection image. For example, this vector can define a "fingerprint" that uniquely represents visual features present on the assembly unit and depicted in this particular inspection image.

The computer system can repeat this process for other inspection images—such as by processing these inspection images in a batch or by processing new inspection images individually upon receipt from an optical inspection station—to generate a population of vectors uniquely representing each assembly unit in this population of imaged assembly units.

6. Manufacturing Inputs

Block S130 of the method S100 recites aggregating non-visual manufacturing data representing a set of manufacturing inputs and conditions along the assembly line during production of the set of assembly units. Generally, in Block S130, the computer system collects other manufacturing related data for assembly units manufactured along the assembly line, including both control inputs and measurement outputs (hereinafter "manufacturing data"), as shown in FIG. 1. For example, control inputs can include: inputs into the assembly line or manufacturing process, such as equipment settings, tool paths, and/or work instructions (e.g., a torque setting for an electronic screwdriver manipulated manually by a technician or operator); component sources; a assembly station technician identifier; etc. Measurement outputs can include: unit-specific sensor data; ambient sensor data; actual assembly equipment process data (e.g., the actual torque measured by an electronic screwdriver during installation of a screw into a particular assembly unit); etc. (Measurement outputs can also include feature vectors generated from features detected in inspection images in Block S120 described above.) "Manufacturing inputs" and "manufacturing data" can therefore include both "hard inputs" and measurement and test result data representing a stack of physical and functional relationships between components and modules combined to form assembly unit; as described below, the computer system can also access assembly unit "outcome data," such as indicating presence of absence of specific functional or aesthetic defects in assembly units and execute Blocks of the method S100 to derive correlations between these manufacturing inputs (i.e., hard inputs and measurement and test result data) and assembly unit outcomes (i.e., presence of absence of specific functional or aesthetic defects).

For example, the computer system can interface with: ambient sensors to collect temperature and humidity data near the assembly line; scales to collect assembly unit weights at particular stages of assembly; part or assembly test rigs to collect assembly unit test results, such as generated by antenna test rigs, touch sensor test and calibration rigs, or environmental test rigs; assembly tools, such as a screwdriver to collect screwdriver torque and dwell time values at a particular assembly stage; fixture and jig data, such as to collect an assembly force, weight distribution, or component presence report generated by sensors integrated into an assembly jig; robotic assembly systems, such as tool paths or log files of a robotic arm or other robotic manipulator—located along the assembly line—during installation of a part onto an assembly; etc. In this example, the user may link the computer system to these sensors and actuators directly, and the computer system can ingest these data in real-time. Alternatively, the user may link the computer system to the database containing these manufacturing data, and the computer system can ingest these data asynchronously.

The computer system can also access: upstream IQC data for parts and subassemblies supplied to the assembly line;

dimensional data and test data for these supplied parts and subassemblies; 2D or 3D CAD models or drawings of parts and subassemblies in the assembly type; dimension, tolerance, and material specifications for these parts and subassemblies; cosmetic templates for the assembly type; data from robotic assembly equipment, CNC tools, injection-molding equipment, and other manufacturing equipment; work instructions or standard operating procedures (e.g., for humans) at assembly stations along the assembly line; etc.

Furthermore, the computer system can access an assembly specification for this assembly type, such as: an order of assembly of individual components; assembly steps and processes; assembly tools, jigs, and fixtures and related specifications; robotic assembly rigs and related processes and tool paths; adhesive types and specifications; etc. for the assembly type.

However, the computer system can implement any other method and technique to ingest structured, unstructured, and/or semi-structured manufacturing data in any other format and related to parts and subassemblies supplied to the assembly line, related to assembly of these parts and subassemblies, etc.

7. Feature Map

Figure 2:
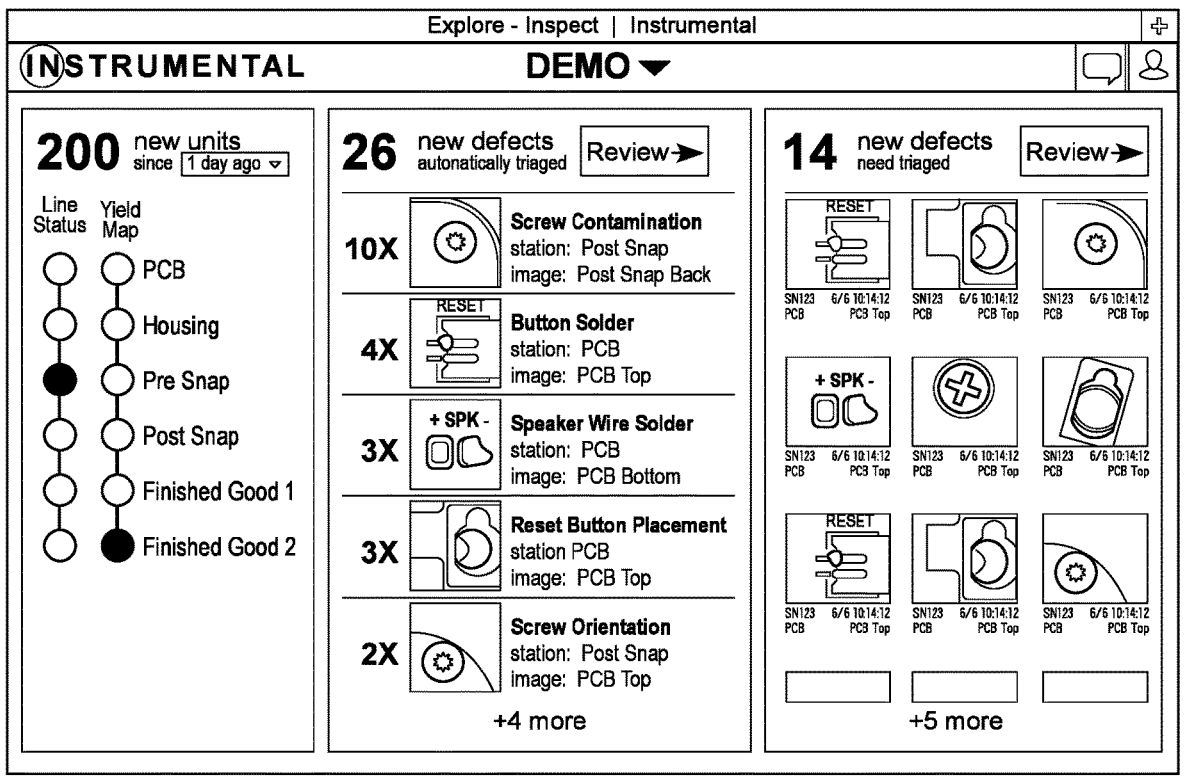
FIG. 2 is a graphical representation of one variation of the method.

The computer system can also interface with the user through the user portal to develop a feature map linking manufacturing inputs and inspection images recorded by optical inspection stations along the assembly line in both time and place, as shown in FIGS. 1 and 2.

In one implementation, sensors, tools, robotic systems, production equipment, assembly stations, etc. in or near the assembly line can record manufacturing-related data while the assembly line is in operation, such as in the form of timestamped data streams including: 1 Hz timeseries ambient humidity data; timestamped peak torque and rotation count of discrete screwdriver operations; timestamped instances of canned cycles of a robotic manipulator (e.g., a "robotic arm") and related errors and peak loads; timestamped instances of heat stake equipment cycles and corresponding tool temperatures; station operator clock-in and clock-out times; etc. An optical inspection station—located in or near the assembly line—can similarly timestamp inspection images of assembly units placed in the optical inspection station.

In this implementation, the computer system can interface with the user via the user portal to record links between these non-visual manufacturing-related data streams and regions of inspection images of assembly units of this assembly type. For example, the user may interface with the computer system via the user portal to: trigger the computer system to initialize a new inspection process for this assembly type and/or assembly line; link this new inspection process to a database of existing inspection images of assembly units previously assembled on the assembly line; and/or link this new inspection process directly to optical inspection stations currently deployed on this assembly line. The computer system can also interpret a series of manufacturing steps (or processes, assembly stations) along the assembly line from production documents uploaded by the user (e.g., by implementing natural language processing to extract manufacturing step descriptions from these production documents) or record manufacturing steps entered manually by the user and then import these manufacturing step definitions into the new inspection process for the assembly type.

The user may then link a subset of manufacturing steps for the assembly type to a particular subregion of the assembly type at a particular assembly stage. For example, the computer system can retrieve a first inspection image of a representative assembly unit of this assembly type at a first stage of assembly and present this first inspection image to the user via the user portal. The user may then: select a first manufacturing step definition—from this set imported into this new inspection process; and draw a bounding box around a component or subassembly depicted in the first inspection image of the representative assembly unit, select a particular object (e.g., a screw, a PCB, a housing, a display), or select a particular feature (e.g., an edge, a surface) depicted in the first inspection image. The computer system can then record a pointer between this first manufacturing step and this bounding box, object, or feature for this first assembly stage of this assembly type. The computer system can interface with the user to repeat this process for each other manufacturing step thus defined for the assembly type.

The computer system can similarly interface with the user to link, connect, or otherwise define relationships between specific data streams (e.g., from sensors and actuators along the assembly line), actuator and operator log files, and/or other non-visual manufacturing-related data related to operation of the assembly line. For example, the user may define a bounding box encompassing the entirety of a representative assembly unit depicted in an inspection image and link this bounding box to ambient temperature and humidity data streams recorded by environmental sensors proximal an assembly station immediately preceding an optical inspection station that recorded this inspection image. In another example, the user may define a bounding box around a threaded fastener in an inspection image of a representative assembly unit at a particular assembly stage and link this bounding box to a data stream for torque, dwell, and rotation count values output by a screw driver at an assembly station on the assembly line immediately preceding an optical inspection station that recorded this inspection image. The computer system can interface with the user to repeat this process for each other manufacturing step, data stream, or non-visual manufacturing-related data source imported into the new inspection process in order to link these steps, data streams, and data sources to particular features, components, or regions depicted in representative inspection images of assembly units of this assembly type at particular stages of assembly.

The computer system can similarly interface with the user to link component supplier data, component characteristics, and/or other component-related data to particular features, components, or regions depicted in representative inspection images of assembly units of this assembly type at particular stages of assembly.

The computer system can extract spatial links between these non-visual manufacturing data streams and features, components, or regions depicted in representative inspection images of assembly units of this assembly type at particular stages of assembly thus tagged or annotated by the user within the user portal. The computer system can then compile these spatial links into a feature map defining spatial associations between: these non-visual manufacturing data streams; stages of assembly of the assembly type (e.g., defining relative time markers for production cycle of the assembly type); and (relative) physical locations of particular features, components, and/or regions in this assembly type.

7.1 Temporal Segmentation

Furthermore, once the computer system has generated this feature map defining these spatial associations, the computer system can define temporal links between segments of these data streams and particular features, components, or regions of individual assembly units produced on the assembly line. In one example, the computer system: accesses a corpus of timestamped inspection image captured by a series of optical inspection stations on the assembly line; implements methods and techniques described in U.S. patent application Ser. No. 15/407,158 to identify unique assembly units represented in these inspection images; and define groups of inspection images, each inspection image group depicting a single assembly unit at each imaged stage of assembly. For each inspection image group, the computer system can: sort inspection images in the inspection image group by timestamp; calculate a set of assembly stage windows based on timestamps between each pair of consecutive inspection images in the group; and then tag each assembly stage window with an identifier of an assembly stage associated with a portion of the assembly line preceding the optical inspection station that recorded the second inspection image in the consecutive pair of inspection images that define this assembly stage time window. Therefore, the computer system can automatically derive a time window for each assembly stage of an assembly unit based on timestamps of inspection images of the assembly unit recorded by optical inspection stations installed at known locations along the assembly line relative to assembly stations at which these assembly stages are completed. The computer system can additionally or alternatively define or refine these assembly stage time windows for individual assembly units based on timestamps of scan data—such as of barcodes applied to individual assembly units or to fixtures assigned to these assembly units—recorded as assembly units enter and/or exit assembly stations along the assembly line.

The computer system can then segment non-visual manufacturing data into clusters of data recorded by sensors, actuators, tools, robotic systems, etc. deployed within a particular assembly station or near a particular section of the assembly line during a particular time window in which a particular assembly unit was present in this particular assembly station or near this particular section of the assembly line. The computer system can repeat this process for each other assembly station and/or section of the assembly line in order to aggregate specific clusters of non-visual manufacturing data that represent environmental conditions, tool conditions, machine actions, operator descriptors, etc. specifically encountered by the particular assembly unit. The computer system can repeat this process for each other assembly unit imaged along the assembly line, thereby temporally segmenting these data streams by corresponding assembly unit and manufacturing step.

However, the computer system can implement any other methods and techniques: to generate a feature map linking manufacturing steps and data output by sensors and actuators along the assembly line to discrete components, areas, or volumes within assembly units of this type; and to segment these sensor and actuator data by temporal relationship to individual assembly unit (or small groups of assembly units) produced along the assembly line over time.

8. First Defective Assembly Unit and Defect Origin Hypothesis

Figure 4:
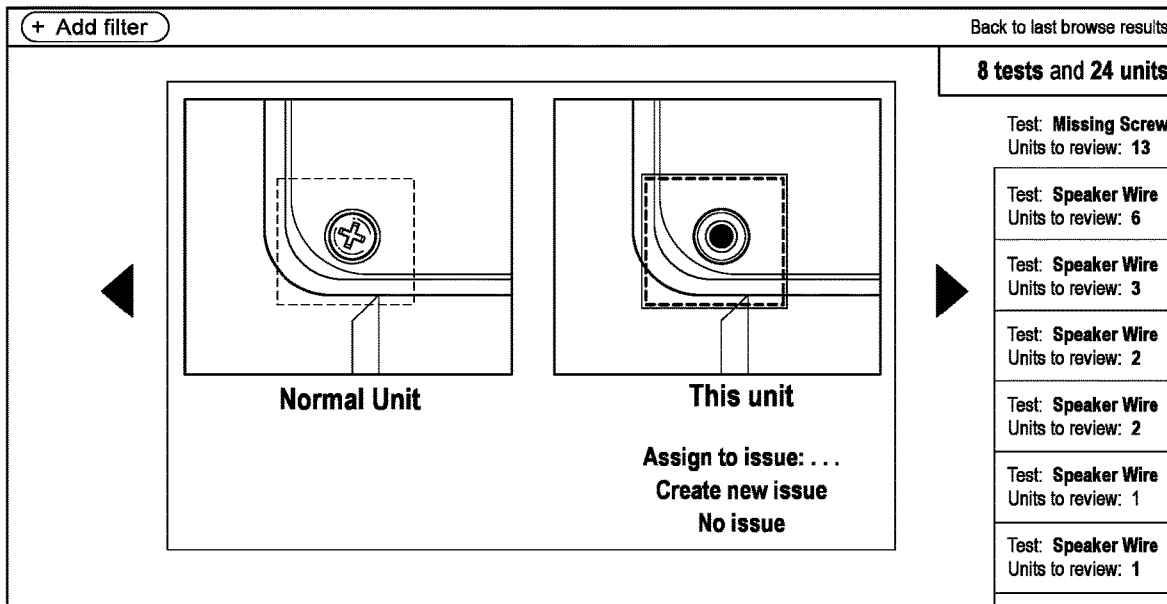
FIG. 4 is a graphical representation of one variation of the method.

As shown in FIGS. 4, 5A, and 5B, once a defect is detected in an assembly unit during production on the assembly line, the user may enter characteristics of this defect into the computer system and submit a hypothesis for a spatial or temporal origin of this defect—that is, a location on the assembly unit or a manufacturing input into the assembly unit that the user predicts yielded this defect.

For example, upon completion of assembly or of an assembly step, an assembly unit maybe inspected manually for aesthetic defects and/or its operation tested for functional defects. When such a defect is thus identified, the user may: access the user portal; enter a serial number of the assembly unit; select a defect type from a dropdown menu prepopulated with known defect types or define a new defect type; enter additional parameters of the defect (e.g., magnitude of a defective function, dimension of an aesthetic defect); and then link the defect time and related parameters to the assembly unit serial number. In another example, the user may view inspection images of assembly units produced on the assembly line via the user portal and then selectively write a defect tag or label to an inspection image of a defective assembly unit. In these examples, the computer system can thus store defect types and related parameters for a defect present in the assembly unit.

The computer system can then interface with the user to define a hypothesis for a spatial and/or temporal origin for the defect. The computer system can also record definitions and hypotheses for multiple instances of the same defect present across multiple assembly units and/or for multiple different defects present across multiple assembly units produced on this assembly line.

8.1 Point-Based Defect Hypothesis

The computer system can then prompt the user to supply a hypothesis for a special or temporal origin of this defect, such as: a feature, component, or region on the assembly unit at a part assembly stage (hereinafter a "region of interest") that the user anticipates may have caused on contributed to the defect; or a time window or manufacturing step that the user anticipates resulted in a change on an assembly unit that yielded this defect. For example, the computer system can access a sequence of inspection images of the assembly unit and present these inspection images to the user through the user portal. The user may then select one of these inspection images and select a singular pixel—in the inspection image—depicting an edge, component, subassembly, or other region of the assembly unit corresponding to an hypothesized origin of the defect. In this example, the computer system can implement methods and techniques described below: to weight visual features extracted from the inspection image proportional to spatial proximity to this pixel; and to weight temporal features defined in the feature map proportional to temporal proximity to a change in a narrow region of the assembly unit depicted by this pixel and/or proportional to temporal proximity to a manufacturing step effecting this narrow region of the assembly unit. The computer system can then aggregate these visual and non-visual features—thus associated with this region of interest and biased according to these weights—into a vector or other container.

8.2 Area-Based Defect Hypothesis

Alternatively, the user may draw a bounding box over a region of interest on this inspection image to indicate a hypothesized location in the assembly unit containing features or components predicted by the user to have yielded the defect. In this example, the computer system can implement methods and techniques described above and below: to extract visual features contained in the region of interest of the inspection image; and to retrieve non-visual features linked to visual features, components, subassemblies, manufacturing steps, or other manufacturing inputs occurring inside of or otherwise effecting this region of interest in the assembly unit, as defined by the feature map and segmented according to time windows of manufacturing steps for the assembly unit. The computer system can then aggregate these visual and non-visual features thus associated with this region of interest into a vector or other container.

8.4 Manufacturing Input Hypothesis for Defect

In another implementation, the user may submit a hypothesis for a link between the test-result-based defect and a particular manufacturing input—rather than for a link between the defect and a particular region of interest on the assembly unit. For example, the user may select: a particular manufacturing step that she anticipates yielded the defect, such as by selecting this particular manufacturing step from a list of manufacturing steps codified for the assembly type; an assembly station at which she anticipates the defect occurred; or a period or assembly stage in which she anticipates the defect occurred.

Accordingly, the computer system can leverage the feature map to: isolate a particular time or time window in which the assembly unit was modified by or exposed to the particular manufacturing input; select an inspection image of the assembly unit recorded nearest (and after) this particular time or time window; and isolate a region of interest within this inspection image that differs from an immediately-preceding image of the assembly unit (and that is therefore likely to represent a change in the assembly unit occurring due to the particular manufacturing input).

The computer system can therefore interface with the user to link a new defect to either a region of interest in an inspection image of an assembly unit or to a manufacturing input, and the computer system can implement the feature map to isolate corresponding non-visual manufacturing data or to define a region of interest, respectively, for this assembly unit.

8.5 Defect Report

Yet alternatively, when a new defect is identified in an assembly unit, the user may upload a defect report to the computer system via the user portal, and the computer system can extract defect-related data from this report—such as defect type (e.g., "antenna failure," "battery failure"), magnitude (e.g., "42% reduction in antenna performance"), and one or more locations or manufacturing steps hypothesized to have caused this defect—and write these defect-related data to a file or other container associated with the assembly unit.

8.6 Defect Identification by Other Stakeholders

Additionally or alternatively, a technician on the assembly line may manually identify a defect in an assembly unit during its assembly and then manually indicate presence and/or location of this defect through a technician portal. The technician portal can then generate and link a defect flag to a digital file or other database corresponding to this assembly unit. Similarly, an engineer of inspector performing inspection of an assembly unit during or upon completion of the assembly unit—such as at a quality control station—may similarly identify a defect and write a defect flag to a digital file or other database corresponding to this assembly unit. The computer system can then retrieve defect data for assembly units produced on the assembly line from these digital files or database.

8.7 Test-Based Defect Identification

In another implementation, rather than label a region of interest on an assembly unit as defective, the user may label a test result value or range for a test designated for this assembly type as defective. The computer system can also interface with the user: to link this test to a particular manufacturing input that the user predicts might yield this defect in this assembly type (e.g., by selecting from a list of manufacturing steps codified for the assembly type); or to link this test result to a region of interest in which the user predicts a feature present in this assembly type might cause this defect (e.g., by manually selecting a pixel or defining a bounding box around the region of interest in a representative inspection image of this assembly type).

The computer system can automatically scan test results for past and/or future assembly units for a test result that matches the test result value or falls within the test result range thus defined for this defect and then flag individual assembly units as defective accordingly, including writing a stored spatial or temporal hypothesis for the origin of this defect to each of these flagged assembly units.

8.8 Defect Origin Hypothesis by Assembly Stage

In one implementation, the computer system can interface with the user to define a spatial hypothesis for an origin of the defect in the form of one region of interest on the assembly type at one target stage of assembly. Thus, in this implementation, the computer system can prompt the user to indicate a target assembly stage hypothesized by the user to contain the origin of the defect in the assembly unit and then annotate an inspection image of the assembly unit—at the target assembly stage—with a region of interest hypothesized by the user to contain the origin of this defect.

Alternatively, the user may elect to dissociate the region of interest from a particular assembly stage and instead define this region of interest for the defect hypothesis across multiple or all assembly stages for the assembly type, such as if multiple manufacturing processes are applied within the region of interest throughout various assembly stages of the assembly type.

For example, the computer system can interface with the user to define a region of interest over a first inspection image of the assembly unit in a first assembly stage. The computer system can then: prompt the user to confirm whether the region of interest applies to a single target assembly stage, to a subset of assembly stages, or to all assembly stages for the assembly type; and aggregate a set of inspection images of the assembly unit according to each assembly stage thus selected by the user. For a second assembly stage thus selected by the user, the computer system can: retrieve a second inspection image of the assembly unit; implement methods and techniques described in U.S. patent application Ser. No. 15/407,158 to align the second inspection image to the first inspection image by aligning a second constellation of features detected in the second inspection image to an analogous first constellation of features contained in the region of interest in the first inspection image; and project a bounding box of the region of interest onto the second inspection image based on the second constellation of features and a relative position of the region of interest to the first constellation of features in the first inspection image. The computer system can repeat this process for each assembly stage selected by the user to define multiple cospatial regions of interest across multiple assembly stages of the assembly unit.

The computer system can extract visual (e.g., spatial) features from regions of interest in each of these inspection images at different assembly stages of the assembly unit. The computer system can also aggregate a set of manufacturing inputs effecting this region of interest across these assembly stages, isolate manufacturing input data streams related to this set of manufacturing inputs, define time windows of interest for these manufacturing input data streams and the assembly unit, and retrieve manufacturing input data (i.e., non-visual features) recorded within these time windows based on the feature map. The computer system can then assemble these visual and non-visual features into a vector or other container representative of the assembly unit.

For example, the computer system can: retrieve each other inspection image depicting the assembly unit at other stages of assembly; align the defect-annotated inspection image and this set of other inspection images of the assembly unit by a global feature present in each of these inspection images or by a reference feature near the selected region of interest (or pixel) in some or all of these inspection images, such as described in U.S. patent application Ser. No. 15/407,162; and then project the region of interest (or pixel) onto each other inspection image. The computer system can then compare this region of interest across consecutive inspection images of the assembly unit to detect changes occurring in this region of interest throughout assembly of the assembly unit. The computer system can then leverage the feature map to identify a subset of manufacturing inputs occurring spatially and temporally proximal these detected changes in the region of interest in the assembly unit during its assembly and incorporate these non-visual features into the vector or container for the assembly unit.

The computer system can also: extract visual features from regions of these inspection images depicting the region of interest of the assembly unit in different assembly stages; and incorporate these visual features into the vector or container for the assembly unit.

8.9 Defect Origin Hypothesis by Temporal Feature

In another implementation shown in FIG. 5B, the computer system interfaces with the user to define a non-visual or temporal hypothesis for an origin of the defect, such as in the form of selection of: a stage of assembly; a manufacturing step; an environmental condition; an assembly station; a station operation; or a component batch identifier; etc. The computer system can then: query the feature map to identify regions of interest in the assembly type containing features that are added to the assembly type, modified within the assembly type, or otherwise exposed to this non-visual or temporal hypothesis. The computer system can therefore automatically define a region of interest containing visual features on the assembly type based on a non-visual or temporal hypothesis for the origin of the defect and then implement the foregoing methods and techniques to aggregate visual and non-visual features proximal this non-visual or temporal hypothesis based on the feature map. In this implementation, the computer system can also automatically reduce a size of the region of interest on the assembly type—thus derived from the non-visual or temporal hypothesis for an origin of the defect based on the feature map—in order to decrease a quantity of visual features extracted from the region of interest if this quantity exceeds a target or threshold quantity allocated for visual features for this defect origin search; and vice versa, as shown in FIG. 5B.

8.10 Automatic Defect Origin Hypothesis

In one variation, the computer system automatically generates a hypothesis for the origin of the defect based on a type of the defect and assembly type functions linked to specific regions of the assembly type in the feature map. For example, in response to receipt of a defect specifying an antenna functional test failure in an assembly unit, the computer system can: query the feature map for a region in one or more upstream inspection images linked to antenna function; and then store this region as a spatial hypothesis for the origin of the defect. In this example, the computer system can additionally or alternatively: query the feature map for an assembly step, station or process in which components or subassemblies affiliated with antenna function—according to the feature map—are installed on assembly type or otherwise modified on the assembly type; and then store this assembly step, station or process as a temporal hypothesis for the origin of the defect.

9. Feature Aggregation

Once a defect is defined for the assembly type and once the computer system identifies a set of (e.g., at least a threshold number of) assembly units exhibiting this defect, the computer system can automatically: aggregate a set of visual features and non-visual manufacturing data exhibiting high temporal and spatial proximity to occurrence of the defect in a particular assembly unit based on the feature map; repeat this process for other assembly units exhibiting and not exhibiting the defect; and then implement artificial intelligence, machine learning, regression, statistical analysis, and/or other methods and techniques to calculate correlations between these visual and non-visual features and the defect across this population of assembly units.

In one implementation, a particular defect is associated with a particular region of interest for the assembly type. For an assembly unit produced on the assembly line, the computer system can: retrieve an inspection image recorded immediately after a particular assembly stage in which features in the particular region of interest changed; project the region of interest associated with this defect onto the inspection image; crop the inspection image around the region of interest; detect and extract a set of visual features from this region of interest (or filter an existing set of visual features already extracted from these inspection images to include features within this region of interest only); and populate a vector or other container with values representing these extracted visual features, thereby generating a container representing a set of visual features exhibiting spatial proximity to a predicted source of a known defect for this assembly type.

In this implementation, the computer system also can: query the feature map of this assembly type for manufacturing inputs (i.e., non-visual features) associated with this region of interest and falling within an assembly time window associated with this defect (e.g., within a time window between the particular assembly stage and a preceding assembly stage); aggregate a subset of non-visual manufacturing data corresponding to these manufacturing inputs for this assembly unit; and append these non-visual manufacturing data to the vector representing this assembly unit. In particular, the computer system can leverage the feature map to isolate non-visual manufacturing data recorded during production of this assembly unit between the particular assembly stage and the preceding assembly stage and affecting features within the region of interest and to inject these non-visual manufacturing data into the vector associated with this assembly unit in order to generate a container including both visual and non-visual features exhibiting high spatial and temporal proximity to a predicted source of the particular defect. For example, the computer system can write: ambient temperature and humidity values within the manufacturing facility or near the assembly line during the assembly time window for this assembly unit; an ID of a technician—working at an assembly station in which the region of interest for the assembly type is modified—during the assembly time window for this assembly unit; a torque reading of a screwdriver used at this assembly station during this assembly time window; a batch ID of a component designated for the region of interest and available at the assembly station during this assembly time window; etc. to the vector or other container for this assembly unit.

9.1 Feature Filter

In one variation shown in FIGS. 5A and 5B, if a defect hypothesis submitted by the user yields more than a maximum number of visual and non-visual features, the computer system can filter these features in order to limit the size of the resulting vector.

In one implementation, if the defect hypothesis defines a region of interest on an inspection image of a defective assembly unit, the computer system can: extract visual features from this region of interest of the assembly unit at a particular assembly stage depicted in an inspection image; query the feature map for non-visual features (e.g., manufacturing inputs) that effect this region of interest, such as within, before, and/or after this assembly stage; collate timeseries manufacturing input data for these non-visual features and for this assembly unit; and aggregate this set of visual and non-visual features.

If the quantity or size of this set of visual and non-visual features exceeds a threshold size (e.g., 4,000 features), the computer system can implement methods and techniques described below to rank these visual features, such as: by proximity to the center of the region of interest; by proximity to a largest visual feature in the region of interest; or by proximity to a target point, pixel, or feature in the region of interest; etc. The computer system can similarly rank these non-visual features, such as: by proximity of corresponding manufacturing processes to the center of the region of interest; by proximity to a largest visual feature in the region of interest; by proximity to a time the inspection image of the assembly unit was recorded; and/or by proximity to the assembly stage of the assembly unit depicted in the assembly unit; etc. The computer system can then: discard the lowest-ranked visual and non-visual features in this set in order to assemble a feature set of the threshold quantity or size; store this filtered set of visual and non-visual features in a vector (or other container) for the defective assembly unit; and label the vector with an identifier of the defect.

In another implementation, if the defect hypothesis defines a region of interest on an inspection image of a defective assembly unit, the computer system can: allocate a fixed quantity of visual features (e.g., 3,000 visual features and 1,000 non-visual features) or a dynamic quantity inversely proportional to a quantity or density of non-visual features available for this region of interest; and then extract visual features from the region of interest in the inspection image at a feature density that produces this allocation of visual features. Similarly, the computer system can extract a set of visual features from the region of interest of the inspection image at a feature density inversely proportional to a size (e.g., an area) of the region of interest.

In the foregoing implementation, the computer system can also set the target quantity of visual features extracted from an inspection image proportional to a total quantity of assembly units produced and imaged on the assembly line. More specifically, the computer system can extract a greater quantity of visual features (or "dimensions") from a region of interest in an inspection image of an assembly unit if a larger population of images of more assembly units at this same assembly stage are available, thereby enabling the computer system to "look deeper" into these assembly units for smaller features that may have caused the defect while also leveraging a larger population of inspection images to reject spurious correlations (or "noise") between features in this higher-dimension feature set and the defect.

9.2 Feature Aggregation for Other Assembly Units

As shown in FIGS. 5A and 5B, the computer system can repeat the foregoing processes to generate similar vectors for many other assembly units produced on the assembly line. For example, the computer system can generate a vector definition (e.g., a set of physical locations, relative time windows, and data sources) for visual and non-visual features represented in a first vector of a defective assembly unit labeled by the user. The computer system can then repeat the foregoing processes to generate like vectors for (many, all) other assembly units completed on the assembly line according to this vector definition. The computer system can also label each of these vectors with an outcome of the corresponding assembly unit. For example, for each assembly unit in which the defect was confirmed (e.g., by the user, by another system, a station operator), the computer system can label the corresponding vector with the identifier of the defect.

In one variation, when a known defect is detected in a subsequent assembly unit, the user may manually tag a file or other container associated with this new assembly unit with the defect. Additionally or alternatively, as reports (e.g., test results) for subsequent assembly units produced on the assembly line are published to a database, the computer system can automatically: scan these reports for test results or other values associated with the known defect; and identify select assembly units as defective accordingly. The computer system can also: automatically scan inspection images of subsequent assembly units for features associated with the known defect; identify select assembly units as defective accordingly, such as described in U.S. patent application Ser. No. 15/953,206; and prompt the user to confirm presence of the defect in these other assembly units.

The computer system can additionally or alternatively prompt the user to manually identify other assembly units of the assembly type in which the defect was detected. However, the computer system can implement any other method or technique to automatically identify defective assembly units, to access identities of assembly units manually identified as defective by the user or other operator, or to access identities of assembly units identified as defective by other systems.

9.3 General Defect Origin Hypothesis

In one variation, the computer system interfaces with the user to record presence of a defect in a batch of assembly units of an assembly type and to define a spatial or temporal hypothesis for the origin of this defect in this assembly type generally rather than for a particular assembly unit (e.g., by defining an region of interest over a CAD model or other virtual representation of the assembly type or flagging a manufacturing step in a set of manufacturing steps extracted from manufacturing documentation). The computer system then: generates a vector definition for the assembly type generally accordingly; projects the region of interest onto inspection images of assembly units of this assembly types; extracts features from this region of interest in each of these inspection images according to the vector definition; aggregates non-visual features for each of these assembly units according to the vector definition; compiles these visual and non-visual features into vectors uniquely representing each assembly unit; and then labels each of these vectors with the outcome of (i.e., presence of the defect in) their corresponding assembly units.

10. Defect Correlation

The computer system can then implement artificial intelligence, machine learning, regression, statistical analysis, and/or other methods and techniques—such as described in U.S. patent application Ser. No. 15/953,206—to compare these vectors and to isolate a singular feature or a cluster of features that are common to vectors associated with assembly units exhibiting the particular defect but generally absent from vectors associated with assembly units not exhibiting the particular defect (or vice versa). In particular, the computer system can execute Blocks of the method S100 to: generate "short" vectors representing a relatively small number of visual and non-visual features temporally and spatially proximal (or contained within) a hypothesized origin of a defect for a population of assembly units; and then compare these vectors in order to isolate a subset of visual and/or non-visual features exhibiting strong covariance with presence of this defect in these assembly units.

10.2 Weighted Features

In one implementation, for each (of many) assembly units produced on the assembly line, the computer system compiles visual features extracted from inspection images of the assembly unit and non-visual manufacturing data collected during production of the assembly unit into an unweighted vector or other container. When a defect is detected in an assembly unit and confirmed by the user, the computer system can calculate a weight for each visual and non-visual feature represented in these vectors based on temporal and spatial proximity to the defect, as defined in the feature map. In particular, the computer system can devalue or mute visual and non-visual features substantially remote from a location of the defect, from a predicted location of a source of the defect, and/or from a time window (e.g., between two assembly stations) in which the defect presented in assembly units of this assembly type. Conversely, the computer system can emphasize visual and non-visual features substantially proximal the location of the defect, from the predicted location of a source of the defect, and/or from the time window in which the defect presented in assembly units produced on the assembly line.

The computer system can then process vectors—including values thus weighted by temporal and spatial proximity to the defect and representing a population of assembly units—according to artificial intelligence, machine learning, regression, statistical analysis, and/or other methods and techniques in order to derive correlations between these features and this defect. By thus weighting these features according to the feature map, the computer system may reduce a time for the computer system to generate these correlations and increase accuracy of these correlations.

10.3 Feature Mask

In a similar implementation, the computer system can implement the feature map to: identify a particular subset of features—represented in vectors corresponding to a population of assembly units—that are temporally and spatially proximal a region of interest associated with a defect in this assembly type; to mask (e.g., weight to "0" or otherwise deemphasize) all other features in these vectors; and then implement artificial intelligence, machine learning, regression, statistical analysis, and/or other methods and techniques to calculate degrees of covariance between features in the particular subset of features and the defect. By thus implementing the feature map as a mask to isolate features that are spatially and temporally close to (e.g., with a time and distance threshold of) the defect and therefore more likely to have caused the defect, the computer system can reduce processing load, increase processing speed, and increase accuracy of a derive correlation between a particular features and the defect.

In yet another implementation, for each assembly unit produced on the assembly line, the computer system can generate a vector representing both visual features detected in a set of inspection images and non-visual manufacturing data recorded during assembly of the assembly unit. The computer system can implement artificial intelligence, machine learning, regression, statistical analysis, and/or other methods and techniques to generate a covariance matrix representing correlations between each of these visual and non-visual features and the defect. The computer system can then implement the feature map to generate a mask—for the covariance matrix—that mutes features that are more than a threshold distance from the defect in time and/or space or that devalues these features that are more than a threshold distance from the defect in time and/or space or that devalues these features proportional to spatial or temporal distance from the defect. By then applying this mask to the covariance matrix, the computer system can filter a (potentially) large set of features that exhibit covariance with presence of the defect in this assembly type down to a relatively small subset of features likely to include a particular feature that caused or predicts the defect.

However, the computer system can implement the feature map in any other way to filter or weight visual and non-visual features based on temporal and spatial proximity to a known defect and can implement any other methods or techniques to derive correlations between these features and the defect.

11. Guidance

Figure 3:
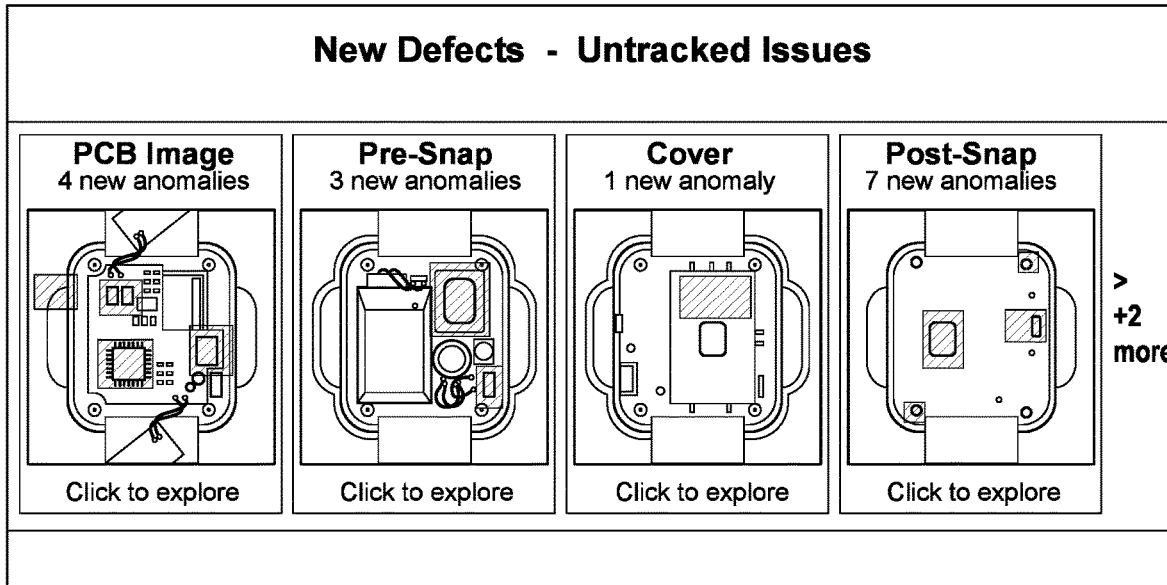
FIG. 3 is a graphical representation of one variation of the method.

As shown in FIGS. 2-4, once the computer system derives a correlation between the defect and either a visual feature present in images of assembly units and/or a non-visual feature representing a manufacturing input, the computer system can: prompt investigation into the feature, such as if correlation between this feature and the defect exceeds a threshold score; and/or generate and serve guidance for reducing frequency of this feature, which may reduce frequency of the defect.

In one implementation, if the computer system derives a strong correlation (e.g., high covariance) between the defect and a particular manufacturing input, the computer system can transform this particular manufacturing input directly into a manufacturing step or process to investigate for a root cause of the defect. For example, if the computer system derives a strong correlation between the defect and a particular sensor stream output by a sensor at a particular assembly stage along the assembly line input, the computer system can: query the feature map to identify a manufacturing step associated with or occurring near this sensor; and then generate guidance to investigate this manufacturing step for a root cause of the defect.

However, if the computer system derives a strong correlation (e.g., high covariance) between the defect and a particular visual feature, cluster of visual features, or region of inspection images recorded at a particular stage of assembly (e.g., by a particular optical inspection station), the computer system can: reference the feature map to identify a particular manufacturing step or process in which a component or detail of the assembly type—represented by this feature, cluster of features, or region of inspection images of these assembly units—is created, incorporated into, or changed in the assembly type; generate a prompt to investigate this particular manufacturing step or process for a root cause of the defect; and then return this prompt to the user. For example, the computer system can derive and update a correlation between the defect and a particular cluster of features depicted in inspection images of assembly units at a particular assembly stage as these inspection images are recorded by an optical inspection station at this particular assembly stage or as these inspection images are made available to the computer system. Once this correlation exceeds a threshold score (or if this correlation exceeds correlations between the defect and all other tested features of the assembly type), the computer system can: query the feature map to identify a component or subassembly that spatially intersects this particular cluster of features; query the feature map to identify a manufacturing step in which this component or subassembly is installed or modified within assembly units of this assembly type; and then generate guidance to investigate this manufacturing step for a root cause (or "origin") of the defect accordingly.

The computer system can implement similar methods and techniques to derive and handle correlations between a defect and a characteristic of a supplied component and/or combinations of visual and/or non-visual features of assembly units of this assembly type.

The computer system can then serve this guidance to the user in order to prompt investigation of a particular manufacturing step, environmental condition, or component characteristics, etc. for causation of the defect. For example, the user may modify a manufacturing step, a manufacturing tolerance, tooling, tools, jigs, fixtures, and/or an assembly technician, etc. responsive to this guidance in order to reduce frequency, magnitude, or range of this particular feature, which may reduce frequency or magnitude of this defect in subsequent assembly units produced on the assembly line.

Therefore, the computer system can generate and serve guidance to the user to prompt the user to investigate a particular control input—such as an equipment setting or condition of a fixture—that exhibits high covariance with a defect in a population of assembly units. (Alternatively, the computer system can automatically modify this particular control input, such as by interfacing directly with equipment to modify this setting, as described below.)

The computer system can also: isolate a dimensional measurement or test result value or range that exhibits high correlation to a particular defect; generate a notification indicating this correlation and a prompt to investigate this dimensional measurement or test; and serve this notification to the user (or to a technician) in order to trigger investigation into this particular dimensional measurement or test result and its relationship with the particular defect. Similarly, the computer system can serve guidance to the user or to a technician on the assembly line to inspect or discard assembly units that exhibit this dimensional measurement or test result.

Therefore, the computer system can execute Blocks of the method S100 to isolate a non-visual manufacturing input (e.g., a control input, a dimensional value, a test result) that exhibits a high degree of covariance with a known defect and to notify the user or a technician of this correlation in order to prompt: an investigation into this manufacturing input at the assembly line; a change to this manufacturing input at the assembly line; or automatic discard or rework of assembly units that exhibit this manufacturing input.

11.1 Guidance Interface

In one variation, the computer system returns a list of visual and non-visual features—ranked by strength of correlation to the defect and/or exceeding a threshold correlation score for the defect—to the user portal in order to inform selective, targeted investigation into these features as possible root causes of the defect. For example, the computer system can: generate a list of assembly steps, a list of manufacturing processes, a list of assembly stations and/or station operators, a list of daily time windows, a list of environment condition ranges, and/or a list of coordinate positions of physical (i.e., visual) features that occur concurrently with presence of the defect in assembly units with high frequency; sort objects in these lists by strength of correlation to the defect; and return these lists—such as in the form of textual descriptions with quantitative or qualitative values and/or as coordinate values—to the user. The computer system can also serve a prompt to the user to investigate features in these lists for the origin of the defect, such as in the order presented on these lists.

The computer system can additionally or alternatively overlay a representative inspection image of the assembly type with a heatmap indicating strengths of correlations of features depicted in the inspection image to the defect. For example, the computer system can: retrieve a representative inspection image of an assembly unit of the assembly type; generate a heatmap depicting strengths of correlations of visual features—present in the region of interest for this defect hypothesis for the assembly type—to the defect; and render the heatmap over the representative inspection image. In this implementation, the computer system can also: populate positions over this representative inspection image—that correspond to non-visual manufacturing features exhibiting more than a threshold correlation to the defect—with a set of flags; and link each of these flags to a non-visual manufacturing feature exposed to, effecting, or otherwise associated with the assembly type at the location of the flag according to the feature map. The computer system can then: serve this annotated inspection image to the user portal for review by the user; and retrieve non-visual manufacturing input data (e.g., live data streams, or raw timeseries data for a defect assembly unit) when a flag in this annotated inspection image is selected at the user portal.

11.2 Example

In one implementation, the computer system implements methods and techniques described above to: access a set of production documents for the assembly type; interpret a sequence of manufacturing steps for the assembly type represented in the set of production documents; and interface with the user to define and record a first set of links between each manufacturing step—in this set of manufacturing steps—and a subregion of the particular assembly type at one or more assembly stages (e.g., by annotating a CAD model of the assembly type or annotating representative inspection images of an assembly unit of the assembly type at various stages of assembly with links to these manufacturing steps). In this implementation, the computer system can interface with the user to: record a bounding box—drawn manually by the user over a CAD model or an inspection image of a representative assembly unit of the assembly type—around a component added to the particular assembly type during a manufacturing step; define a subregion of the assembly effected during this manufacturing step according to the bounding box; write a pointer for the manufacturing step to this assembly subregion; and repeat this process for each other manufacturing step thus associated with this assembly type. In this implementation, the computer system can: similarly interface with the user to define and record a second set of links between a set of manufacturing input data streams and manufacturing steps in the set of manufacturing steps; and then compile the first and second sets of links into a feature map for the assembly type.

For example, for a particular manufacturing step in this set, the computer system can: record selection of a threaded fastener—depicted in a particular subregion in an inspection image of a representative assembly unit of the assembly type at a particular stage of assembly—installed on the particular assembly type during the particular manufacturing step; and then link a particular subregion of the particular assembly type containing the threaded fastener to this particular manufacturing step. In this example, the computer system can also: receive selection of a particular data stream— containing torque output values and torque dwell values output by a screwdriver—entered via the user portal; and then link this particular data stream to the particular manufacturing step. Accordingly, the computer system can link the particular data stream to the particular subregion of the particular assembly type and to the particular stage of assembly (and therefore to a time window of the particular stage of assembly for an assembly unit of this assembly type). Later, the computer system can calculate: correlations between torque output values of the screwdriver, torque dwell values of the screwdriver, and a defect for assembly units of this assembly type; and prompt the user to investigate screwdriver torque and/or screwdriver dwell for this manufacturing step if corresponding correlations to the defect exceed a threshold correlation and/or exceed correlations of other visual and non-visual features near this region of interest and near the particular assembly stage.

11.3 Automatic Defect Detection

In one variation shown in FIG. 5A, the computer system can implement any other methods or techniques to scan inspection images and/or non-visual manufacturing input data for additional assembly units that exhibit visual or non-visual features correlated with the defect and to then prompt the user to inspect these other assembly units for the defect.

For example, once the user confirms a spatial or temporal feature as a root cause of a defect, the computer system can: search inspection images and manufacturing input data for a subset of other assembly units produced on the assembly line for the same or similar spatial or temporal feature; and automatically flag this subset of other assembly units for investigation for presence of the defect, such as by generating a list of serial numbers of these flagged assembly units and serving this list of serial numbers to the user to inform selective, targeted investigation of assembly units produced on this assembly line for presence of this defect.

12. Failed Correlation Search

In one variation shown in FIGS. 5A and 5B, if the computer system executes the foregoing processes based on a spatial or temporal hypothesis for the defect but fails to identify a visual or non-visual feature that exhibits a correlation to the defect greater than a threshold correlation, the computer system can prompt the user to enter an alternate hypothesis for the defect and then repeat the foregoing processes to retest this alternate hypothesis for visual or non-visual features that exhibit stronger correlation to the defect.

For example, if magnitudes of correlations between visual features (extracted from the region of interest within inspection images of assembly units or proximal a more specific target location in these inspection images), subsets of non-visual manufacturing features (associated with locations on these inspection images within the region of interest or proximal the target location), and the defect remain below a threshold correlation (e.g., 0.70), the computer system can prompt the user to define an alternate region of interest (or an alternate target location) hypothesized by the user to contain an alternate origin of the defect for this assembly type. Then, for each assembly unit in this population of assembly units manufactured on the assembly line, the computer system can: project this alternate target location onto the inspection image of the assembly unit; detect a second set of visual features proximal the second target location (or within a surround region of interest) in the inspection image; and aggregate a second set of non-visual manufacturing features associated with locations proximal the second target location (or within the region of interest) for this assembly unit. The computer system can then calculate a second set of correlations between this second set of visual and non-visual manufacturing features across the population of assembly units and the defect occurring within the population of assembly units, as described above. The computer system can repeat this process to ingest new hypotheses for the origin of the defect for the assembly type until the computer system identifies a visual or non-visual feature with correlation to the defect that exceeds the threshold correlation.

Alternately, the computer system can record multiple spatial and/or temporal hypotheses for the origin of the defect for the assembly type and then sequentially execute Blocks of the method S100 for each of these hypotheses until a correlation between a feature in one of these hypotheses and the defect exceeds the threshold correlation.

13. Multiple Concurrent Defect Origin Hypotheses

In one variation, the computer system interfaces with the user to define multiple spatial and/or temporal hypotheses for the origin of a defect in an assembly unit. For example, the computer system can interface with the user according to the forgoing methods and techniques to define a quantity of hypotheses for the origin of the defect: inversely proportional to an area (e.g., length and width) of a region of interest defined on an inspection image of the defect assembly unit; inversely proportional to a quantity of features exceeding a threshold size or weight present in a region of interest defined on the inspection image of the defect assembly unit; inversely proportional to a number of assembly stages affiliated with the region of interest; inversely proportional to a duration of the assembly stage(s) affiliated with the region of interest; and/or inversely proportional to a quantity of manufacturing input data streams affiliated with the region of interest or these the assembly stage(s). for each region of interest thus far defined for the assembly unit. In particular, the computer system can enable the user to input or define a quantity of additional hypotheses for the origin of the defect in the assembly unit inversely proportional to a quantity of visual and non-visual features available for defect hypotheses already submitted for the assembly unit.

For example, when presence of a defect in an assembly unit is indicated to the computer system, the computer system can record a bounding box—drawn manually over a subregion of a representative inspection image of the assembly unit via the user portal—thus hypothesized by the user to contain the origin of the defect, as described above. If an area of the bounding box falls below a threshold area, if a quantity of assembly units of this assembly type exceeds an absolute threshold quantity, and/or if a ratio of the quantity of assembly units of this assembly type to the area of the bounding box exceeds a threshold ratio, the computer system can: prompt the user to enter a second hypothesis for the origin of the defect; record a second bounding box—drawn manually over a second subregion of an inspection image of the assembly unit in the same or other assembly stage—hypothesized by the user to contain the origin of the defect; and repeat the foregoing processes to extract features from a second region of interest defined by this second bounding box and to aggregate non-visual features associated with this second region of interest based on the feature map. The computer system can then compile these visual and non-visual features into a second vector (or other container) for the assembly unit and the second hypothesis.

The computer system can then execute Blocks of the method S100 to: generate similar pairs of vectors for the first and second hypotheses for other assembly units of the assembly type; and derive correlations between the defect and contents of the resulting set of first vectors and the resulting set of second vectors for these assembly units. The computer system can then implement deep learning, artificial intelligence, machine learning, regression, statistical analysis, and/or other methods and techniques to derive correlations between the defect and features represented in a population of vectors—representing a single defect hypothesis—as described above and repeat this process for each other population of vectors corresponding to one defect hypothesis.

Alternatively, the computer system can: compile visual and non-visual features corresponding to both hypotheses for the defective assembly unit into one vector; generate similar vectors for other assembly units of the assembly type; and derive correlations between the defect and contents of the resulting set of vectors for these assembly units. The computer system can then implement deep learning, artificial intelligence, machine learning, regression, statistical analysis, and/or other methods and techniques to derive correlations between the defect and features represented in a population of vectors—representing multiple hypotheses for the defect—as described above.

However, the computer system can enable the user to enter additional (e.g., secondary, tertiary) hypotheses for the origin of the defect and can selectively implement Blocks of the method S100 to test these defect hypotheses according to any other schema.

14. Closed-Loop

In one variation, after the user modifies a manufacturing input response to guidance served by the computer system and while the assembly line is still operational, the computer system can repeat the foregoing methods and techniques to collect manufacturing data and inspection images of these new assembly units. The computer system can also compare these new manufacturing data to historical manufacturing data to determine whether a change was made along the assembly line and then verify whether this change resulted in a change in frequency or severity of the defect.

15. Variation: Automated Process Change

In one variation, rather than serve guidance to the user to modify a process along the assembly line to reduce frequency of the defect, the computer system can automatically modify a process (e.g., an equipment setting, an ambient condition, a supplier designated to supply a particular component) based on a spatial and temporal location of a defect occurring in assembly units at a particular stage along the assembly line and based on a manufacturing input proximal this particular stage, as indicated in the feature map. The computer system can then repeat the foregoing methods to automatically check subsequent assembly units for this defect and can implement closed-loop controls to further modify this manufacturing process automatically based on degrees of this defect detected in these subsequent assembly units.

16. Variation: Preloaded Defect Predictions

In one variation, the computer system interfaces with the user to generate a predefined set of possible defects for an assembly type and to link each possible defect to one or more defect modes, wherein each defect mode is linked to a region of interest and to an assembly time window (or discrete assembly time) for the assembly type. For example, the user may define a generic wireless antenna failure defect and define a set of defect modes including: "screw missing," "crystal position too close to component," "crystal position too far from component", and "ambient humidity limit exceeded after reflow." In this example, the computer system can interface with the user to link these defect modes to particular manufacturing steps, manufacturing data streams, and/or actuator actions along the assembly line.

When an assembly unit is later assembled, tested, and determined to exhibit a particular defect, the computer system can: access an inspection image recorded during the assembly time window specified for a defect mode of this defect; automatically project a stored region of interest for this defect mode on this inspection image; extract visual features from this region of interest; aggregate manufacturing inputs—related to this region of interest and the assembly time window by the feature map—for the assembly unit; compile these visual and non-visual features into a vector or other container representing the assembly unit; and weight these features by physical and temporal proximity to the region of interest and to the assembly time window, as described above.

The computer system can repeat this process to generate weighted vectors representing other assembly units of the same assembly type labeled as exhibiting this defect; and to generate weighted vectors representing other assembly units of the same assembly type labeled as not exhibiting this defect. Accordingly, the computer system can then implement methods and techniques described above to derive a correlation between a particular physical feature and/or manufacturing input for the assembly unit and this defect mode. The computer system can also: generate similar vectors for these assembly units based on regions of interest and assembly time windows specified in other predefined defect modes; and implement the foregoing methods and techniques to derive correlations between particular physical features and/or manufacturing inputs and each of these defect modes. Accordingly, the computer system can serve guidance to the user to investigate manufacturing steps along the assembly line for defects resulting from a related defect mode exhibiting greatest covariance to visual and non-visual features detected in assembly units produced on the assembly line.

17. Variation: Outcome Range

In one variation, the computer system implements similar methods and techniques to derive correlations between range of visual/non-visual assembly unit features and range of outcomes for the assembly type.

In one implementation, rather than ingest binary defect information (i.e., whether an assembly unit exhibits a defect), the computer system can ingest higher-resolution test data for assembly units produced on the assembly line and then implement methods and techniques described above to isolate a small number of visual and/or non-visual assembly unit features that exhibit high covariance with a range of test values. The computer system can then communicate a correlation between ranges of these features and these ranges of test values to the user, such as in the form of a report or notification, as described above.

18. Variation: Anomaly Detection

In one variation, the computer system implements methods and techniques described in U.S. patent application Ser. No. 15/953,206: to compare visual features within a population of completed or in-process assembly units; and to detect a visual anomaly in a particular region of an assembly unit at a particular stage of assembly. The computer system then queries the feature map for a set of manufacturing inputs related to this anomaly, such as ranked by: physical proximity of a location associated with the manufacturing input to the location of the defect in the assembly unit; and by temporal proximity to the manufacturing input to an manufacturing step occurring at or near the anomaly.

For example, the computer system can implement the feature map: to identify a particular manufacturing step (e.g., insertion of a screw, application of an adhesive, placement of a part or subassembly) designated for a location within assembly units of this type at or near the location of the anomaly detected in this assembly unit; and to identify a time during manufacturing of this assembly unit at which this particular manufacturing step occurred. The computer system can then: retrieve non-visual manufacturing data recorded along the assembly line, corresponding to the manufacturing facility more generally, related to parts supplied along the assembly line, etc.; link these non-visual manufacturing data to discrete locations or regions within the assembly unit based on the feature map; and calculate weights for these non-visual manufacturing data as an inverse function of physical distance to the location of the anomaly in the assembly unit and temporal offset from the time of the particular manufacturing step occurred at the assembly unit. The computer system can then implement deep learning, artificial intelligence, machine learning, regression, statistical analysis, and/or other methods and techniques—such as described in U.S. patent application Ser. No. 15/953,206—to compare weighted manufacturing inputs between this anomalous assembly unit and other assembly units not exhibiting this anomaly in order to isolate a subset of manufacturing input exhibiting greatest correlation to this anomaly (i.e., manufacturing inputs most likely to have led to the anomaly).

The computer system can then generate a report including: a prompt to inspect the assembly unit for this anomaly; manufacturing data for these manufacturing inputs exhibiting greatest correlation with the anomaly; a prompt to confirm whether the anomaly represents a defect; and a prompt to confirm a link between the anomaly and these manufacturing inputs. The computer system can serve this notification to the user via the user portal (or to another engineer or technician at the assembly line)—such as in real-time or following completion of the assembly unit. The computer system can therefore: selectively prompt the user to provide guidance (i.e., "human supervision") related to this anomaly; and intelligently suggest possible root causes of this anomaly (i.e., by ranking or filtering manufacturing inputs by spatial and temporal proximity to the anomaly), thereby targeting feedback from the user, streamlining input of such feedback, and reducing a burden on the user to identify, verify, and investigate this anomaly.

In this implementation, the computer system can therefore: detect a visible anomaly in an inspection image of an assembly unit; leverage the feature map to link this anomaly to other manufacturing inputs; weight these manufacturing input by temporal and physical proximity to this visible anomaly; compare weighted non-visual manufacturing data between the anomalous assembly unit and other assembly units not exhibiting this anomaly in order to predict a manufacturing input that represents a root cause of this anomaly; and to prepare a report for this anomaly, including both visual data depicting the anomaly and a suggestion for a manufacturing input related to this anomaly.

The computer system can implement similar methods and techniques: to compare manufacturing inputs within a population of completed or in-process assembly units; and to detect a non-visual anomaly in one or a subset of these manufacturing inputs for a particular assembly unit during assembly. The computer system can then query the feature map to: identify an assembly time or time window in which the assembly unit was exposed to or modified according to this anomalous manufacturing input; select a particular inspection image of the assembly unit recorded during or immediately following this assembly time or time window; and then isolate a particular location or region of interest within this particular inspection image corresponding to a location on this assembly unit modified by or otherwise exposed to this anomalous manufacturing input.

The computer system can then implement artificial intelligence, machine learning, regression, computer vision, statistical analysis, and/or other methods and techniques to: extract or aggregate features within this region of interest; project this region of interest onto like inspection images of other assembly units excluding this anomaly in non-visual manufacturing data; extract or aggregate features within this region of interest in these other inspection images; weight these features by temporal and physical distance from the anomalous manufacturing input; and compare features between this region of interest in these inspection images in order to isolate a subset of visual features exhibiting greatest correlation to this anomalous manufacturing input (i.e., visual features that may depict a physical result of this anomalous manufacturing input). The computer system can then: aggregate this anomalous manufacturing input and this region of interest or a more specific subset of features in the inspection image of the assembly unit into a report; serve this report to the user via the user portal; and thus prompt the user to provide selective feedback to verify whether this anomalous manufacturing input has resulted in a defect in a location on the assembly unit depicted in this region of interest in the inspection image.

18.1 Examples

Therefore, in this variation, the computer system can detect an anomaly—rather than an explicit, predefined, or user-verified defect—in non-visual manufacturing data and/or in inspection images of assembly units produced on the assembly line, such as described in U.S. patent application Ser. No. 15/953,206.

In one example, the computer system identifies individual assembly units or cluster of assembly units that contain components in relative positions, of sizes, and/or of geometries, etc. that differ from constellations of components in (many) other assembly units—of the same assembly type—produced on the assembly line (e.g., labeled as fully-functional or non-defective). The computer system can then flag these assembly units exhibiting this visual anomaly relative to the population of completed assembly units of this assembly type. Accordingly, the computer system can then implement the foregoing methods and techniques to: identify non-visual features proximal this visual anomaly based on the feature map; define time windows for these non-visual features specific to each assembly unit; aggregate these non-visual features into vectors or other containers for each assembly unit; derive correlations between the anomalous visual feature and these other non-visual features; isolate one or a subset of non-visual features exhibiting greatest correlation to the anomalous visual feature; and return a prompt to the user to inspect assembly units with the anomalous visual feature in the context of the one or subset of non-visual features exhibiting greatest correlation to the anomalous visual feature. Therefore, in this implementation, the computer system can automatically isolate particular manufacturing inputs that may have contributed to a yet-uncharacterized physical anomaly in some assembly units and then present both the uncharacterized physical anomaly and these particular manufacturing inputs to the user, thereby enabling the user to quickly trace a root cause of the physical anomaly, determine whether the physical anomaly yields a defective assembly unit, and address changes at the assembly line to directly reduce frequency of this physical anomaly.

In a similar example, the computer system can identify individual assembly units or clusters of assembly units for which screwdriver torques during a particular assembly step, ambient humidity, heat stake tool temperature, time between consecutive optical inspection stations, a time between consecutive assembly stages, and/or another manufacturing input differed from like non-visual features of (many) other assembly units—of the same assembly type—produced on the assembly line (and labeled as fully-functional or non-defective). Accordingly, the computer system can implement the foregoing methods and techniques to: identify assembly stages or manufacturing processes related to the non-visual anomaly; identify regions of interest or specific visual features effected within the assembly units during these assembly stages or manufacturing processes based on the feature map; aggregate visual features within these regions of interest into vectors or other containers for each assembly unit; derive correlations between the anomalous non-visual feature and these other visual features; isolate one or a subset of visual features exhibiting greatest correlation to the anomalous non-visual feature; and return a prompt to the user to inspect assembly units with the anomalous non-visual feature in the context of the one or subset of visual features exhibiting greatest correlation to the anomalous non-visual feature. Therefore, in this implementation, the computer system can automatically isolate particular points, edges, corners, surfaces, or volumes within the assembly type that may have been effected by a yet-uncharacterized manufacturing input anomaly in some assembly units and then present both the uncharacterized manufacturing input anomaly and these particular points, edges, corners, surfaces, or volumes within the assembly type to the user, thereby enabling the user to quickly trace an effect of the manufacturing input anomaly, determine whether the manufacturing input anomaly yields a defective assembly unit, and address changes at the assembly line to directly reduce frequency of this manufacturing input anomaly.

However, the computer system can access a definition and related data for a new defect in assembly units produced on the assembly line and/or isolate a new anomaly in a population of assembly units of this assembly type in any other way. The computer system can also implement any other method and technique to identify this new defect or anomaly in other assembly units produced on the assembly line.

The computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for monitoring manufacture of assembly units comprises:
   accessing a set of non-visual features for a set of assembly units, of a particular assembly type, during production of the set of assembly units;
   linking the set of non-visual features to locations within assembly units of the particular assembly type;
   during a first time period:
      identifying a defect in a first subset of assembly units, in the set of assembly units of the particular assembly type;
      accessing a first inspection image, in a set of inspection images depicting the first subset of assembly units, recorded at an optical inspection station during production of the first subset of assembly units; and
      calculating correlations between a first set of visual features in the first inspection image proximal a target location, a first subset of non-visual features associated with locations proximal the target location, and the defect; and
   during a second time period following the first time period:
      isolating a particular non-visual feature, in the set of non-visual features, exhibiting correlation to the defect exceeding a threshold correlation; and
      generating a prompt to inspect a source of the particular non-visual feature.

2. The method of claim 1:
   wherein linking the set of non-visual features comprises accessing a feature map linking the set of non-visual features to locations within assembly units of the particular assembly type; and
   further comprising, during the first time period:
      accessing the target location, for the particular assembly type, hypothesized by a user to contain an origin of the defect;
      projecting the first target location onto the first inspection image;
      detecting the first set of visual features proximal the target location in the inspection image; and
      based on the feature map, aggregating the first subset of non-visual features, in the set of non-visual features, associated with locations proximal the target location.

3. The method of claim 2, wherein aggregating the first subset of non-visual features, in the set of non-visual features, associated with locations proximal the target location comprises:
   accessing a timestamp of the first inspection image;
   extracting a cluster of non-visual features, in the set of non-visual features, associated with times proximal the timestamp of the first inspection image; and
   extracting the first subset of non-visual features, associated with locations proximal the target location for the assembly unit, from the cluster of non-visual features.

4. The method of claim 1, wherein accessing the set of non-visual features comprises accessing a timeseries of data selected from the set of input data, the time series of data comprising:
- a timeseries of manufacturing input data at an assembly line during production of the set of assembly units;
- a timeseries of environmental data recorded proximal the assembly line;
- a timeseries of identifiers of technicians present on the assembly line; and
- a timeseries of operations of tools on the assembly line.

5. The method of claim 1:
- further comprising, during the first time period, accessing a target assembly stage, for the first subset of assembly units of the particular assembly type, hypothesized by the user to contain the origin of the defect; and
- wherein accessing the first inspection image, in the set of inspection images, comprises, accessing the first inspection image recorded by the optical inspection station upon conclusion of the target assembly stage for the set of assembly units.

6. The method of claim 1:
- wherein linking the set of non-visual features comprises accessing a feature map linking the set of non-visual features to locations within assembly units of the particular assembly type; and
- further comprising:
  - accessing a set of production data for the particular assembly type;
  - interpreting a set of manufacturing steps for the particular assembly type represented in the set of production data;
  - associating each manufacturing step, in the set of manufacturing steps, with an assembly subregion, in a set of assembly subregions, of the particular assembly type;
  - associating each manufacturing step, in a subset of manufacturing steps, in the set of manufacturing steps, with a set of manufacturing input data streams, of the particular assembly type; and
  - compiling the set of manufacturing steps, the set of assembly subregions, and the set of manufacturing input data streams into the feature map for the particular assembly type.

7. The method of claim 6, wherein associating each manufacturing step, in the set of manufacturing steps, with the assembly region, in the set of assembly subregions, of the particular assembly type, comprises:
- recording a bounding box, drawn manually over a representative inspection image of the particular assembly type, around a component added to the particular assembly type during the manufacturing step;
- defining the assembly subregion, in the set of assembly subregions, based on the bounding box; and
- writing a pointer for the manufacturing step to the assembly subregion.

8. The method of claim 6:
- wherein associating each manufacturing step, in the set of manufacturing steps, with the assembly region, in the set of assembly subregions, of the particular assembly type, comprises:
  - recording selection of a threaded fastener, depicted in a particular subregion in a representative inspection image of the particular assembly type, installed on the particular assembly type during a particular manufacturing step; and
  - linking a particular subregion of the particular assembly type containing the threaded fastener to the particular manufacturing step;
- wherein associating each manufacturing step, in the subset of manufacturing steps, in the set of manufacturing steps, with the set of manufacturing input data streams, of the particular assembly type comprises:
  - accessing a particular data stream containing torque output values and torque dwell values output by a screwdriver; and
  - linking the particular data stream to the particular manufacturing step;
- wherein compiling the set of manufacturing steps, the set of assembly subregions, and the set of manufacturing input data streams into the feature map for the particular assembly type comprises linking the particular data stream to the particular subregion of the particular assembly type; and
- wherein calculating correlations between the first set of visual features in the first inspection image proximal the target location, the first subset of non-visual features associated with locations proximal the target location, and the defect comprises calculating correlations between torque output values of the screwdriver, torque dwell values of the screwdriver, and the defect for the first subset of assembly units.

9. The method of claim 1, wherein generating a prompt to inspect a source of the particular non-visual feature, comprises:
- isolating the first subset of non-visual features, from the set of non-visual features, exhibiting correlations to the defect greater than the threshold correlation;
- isolating a first subset of visual features, from the first set of visual features, proximal the target location in the first inspection image, exhibiting correlations to the defect greater than the threshold correlation;
- aggregating the first subset of non-visual features and the first subset of visual features into a feature list ranked by strength of correlation to the defect; and
- serving the prompt to the user to investigate features in the feature list for an origin of the defect.

10. The method of claim 9, wherein serving the prompt to the user to investigate features in the feature list for the origin of the defect, comprises:
- retrieving a representative inspection image of the particular assembly type;
- rendering a heatmap depicting correlations of the first subset of visual features over the representative inspection image;
- populating positions over the representative inspection image corresponding to non-visual features in the first subset of non-visual features with a set of flags, each flag in the set of flags linked to non-visual features in the first subset of non-visual features; and
- serving the representative inspection image to a user portal accessed at a computing device affiliated with the user.

11. The method of claim 1, further comprising, during the first time period:
- accessing the target location, for the particular assembly type, hypothesized by the user to contain an origin of the defect comprising recording a bounding box, drawn manually over a subregion of the first inspection image of the particular assembly type, hypothesized by the user to contain the origin of the defect; and extracting the first set of visual features from the subregion of the first inspection image at a feature density proportional to a quantity of assembly units in the set of assembly units.

12. The method of claim 1, further comprising, in response to magnitudes of correlations between the first set of visual features proximal the first target location, the first subset of non-visual features associated with locations proximal the first target location, and the defect remaining below the threshold correlation:
prompting the user to select a second target location in the first inspection image, for the particular assembly type, hypothesized by the user to contain an alternate origin of the defect; and
calculating a second set of correlations between a second set of visual features in the first inspection image proximal the second target location, a second subset of non-visual features associated with locations proximal the second target location, and the defect for the set of assembly units.

13. The method of claim 1:
further comprising, during the second time period following the first time period:
accessing a second target location, for the particular assembly type, hypothesized by the user to contain an origin of the defect, the second target location offset and distinct from the first target location; and
calculating a second set of correlations between a second set of visual features proximal the second target location, a second subset of non-visual features associated with locations proximal the second target location, and the defect; and
wherein generating the prompt to inspect the source of the particular non-visual feature comprises:
aggregating the first subset of non-visual features, the first set of visual features, the second subset of non-visual features, and the second set of visual features into a feature list scored by strength of correlation to the defect; and
serving the prompt to the user to investigate features in the feature list for an origin of the defect.

14. The method of claim 13:
further comprising, during the first time period, accessing the target location, for the particular assembly type, comprising recording a bounding box, drawn manually over a first subregion of a representative inspection image of the particular assembly type, hypothesized by the user to contain the origin of the defect; and
wherein accessing the second target location hypothesized by the user to contain the origin of the defect comprises:
in response to an area of the bounding box falling below a threshold area, prompting the user to enter a second hypothesis for the origin of the defect; and
recording a second bounding box, drawn manually over a second subregion of the representative inspection image of the particular assembly type, hypothesized by the user to contain the origin of the defect.

15. The method of claim 13, wherein accessing the second target location hypothesized by the user to contain the origin of the defect comprises:
in response to a quantity of assembly units in the set of assembly units exceeding a threshold quantity, prompting the user to enter a second hypothesis for the origin of the defect; and
recording a second bounding box, drawn manually over a second subregion of the representative inspection image of the particular assembly type, hypothesized by the user to contain the origin of the defect.

16. The method of claim 1, further comprising, in response to receipt of confirmation of the particular non-visual manufacturing features as the origin of the defect:
scanning the set of non-visual features for a second subset of assembly units, in the set of assembly units, associated with the particular non-visual feature; and
prompting the user to inspect the second subset of assembly units for the defect.

17. The method of claim 1:
wherein isolating the particular non-visual feature comprises isolating a particular input, in the set of inputs, linked to visual features and non-visual features exhibiting greatest correlation to the defect; and
further comprising, during the second time period following the first time period, generating a prompt to inspect the particular input for the origin of the defect.

18. The method of claim 1:
further comprising, during the first time period:
calculating a weighted set of visual features, in the set of visual features, based on proximity to the target location; and
calculating a weighted set of non-visual features, in the subset of non-visual features, based on proximity to a set of manufacturing steps associated with the target location for the particular assembly type;
wherein calculating correlations comprises calculating correlations between the first set of visual features in the first inspection image proximal the target location, the first subset of non-visual features associated with locations proximal the target location, and the defect, based on the weighted set of visual features and the weighted set of non-visual features; and
further comprising, during the second time period following the first time period, predicting a particular input, in the set of inputs, linked to visual features and non-visual features exhibiting greatest correlation to the defect.

19. The method of claim 1, further comprising:
during the first time period:
extracting a set of visual features proximal a target location in the first inspection image hypothesized by a user to contain the defect;
calculating a weighted set of visual features based on proximity of the set of visual features to the defect identified in the first inspection image; and
calculating correlations between the weighted set of visual features proximal the target location, a subset of weighted non-visual features associated with locations proximal the target location, and the defect for first subset of assembly units; and
during the second time period following the first time period, isolating the particular non-visual feature, in the second set of non-visual features, exhibiting correlation to the defect exceeding a threshold correlation.

* * * * *